(12) United States Patent
Sands et al.

(10) Patent No.: US 8,897,347 B2
(45) Date of Patent: Nov. 25, 2014

(54) ALIEN INTERFERENCE REMOVAL IN VECTORED DSL

(71) Applicant: Ikanos Communications, Inc., Fremont, CA (US)

(72) Inventors: Nicholas P. Sands, Sausalito, CA (US); Kevin D. Fisher, Palo Alto, CA (US)

(73) Assignee: Ikanos Communications, Inc., Fremont, CA (US)

( * ) Notice: Subject to any disclaimer, the term of this patent is extended or adjusted under 35 U.S.C. 154(b) by 0 days.

(21) Appl. No.: 14/144,116

(22) Filed: Dec. 30, 2013

(65) Prior Publication Data

US 2014/0112380 A1   Apr. 24, 2014

Related U.S. Application Data

(63) Continuation of application No. 13/058,477, filed as application No. PCT/US2009/053235 on Aug. 8, 2009, now Pat. No. 8,619,843.

(60) Provisional application No. 61/088,430, filed on Aug. 13, 2008.

(51) Int. Cl.
| | |
|---|---|
| *H04B 1/38* | (2006.01) |
| *H04L 5/16* | (2006.01) |
| *H04M 11/06* | (2006.01) |
| *H04B 3/46* | (2006.01) |
| *H04B 3/32* | (2006.01) |

(52) U.S. Cl.
CPC ............ *H04B 3/32* (2013.01); *H04M 11/062* (2013.01); *H04B 3/464* (2013.01); *Y02B 60/36* (2013.01)
USPC .......................................... 375/222; 375/257

(58) Field of Classification Search
CPC ........... H04B 3/464; H04B 3/32; Y02B 60/36
USPC .......................................................... 375/222
See application file for complete search history.

(56) References Cited

U.S. PATENT DOCUMENTS

2005/0195892 A1*  9/2005  Ginis et al. .................... 375/222
2009/0175156 A1*  7/2009  Xu ................................. 370/201

(Continued)

FOREIGN PATENT DOCUMENTS

WO   WO2009/152188 A2    12/2009

OTHER PUBLICATIONS

Ginis et al., "Vectored Transmission for Digital Subscriber Line Systems," IEEE JSAC special issue on twisted-pair transmission, vol. 20, Issue 5, pp. 1085-1104, Jun. 2002.

(Continued)

*Primary Examiner* — Erin File
(74) *Attorney, Agent, or Firm* — Pillsbury Winthrop Shaw Pittman LLP

(57) ABSTRACT

A vectored DSL system reduces or eliminates correlated alien interference in active DSL lines in the vectored system by collecting pseudo signals from inactive lines that do not carry upstream DSL transmissions and/or from common-mode voltage signals from active lines. The collected pseudo signals contain in-domain interference, such as FEXT interference from the active DSL lines in the vectored system, and correlated alien interference. After removing the in-domain interference from the pseudo signals, the remaining alien interference data can be used to generate FEXT cancellation coefficients or the like that are used in DSL vectoring to remove the correlated alien interference from upstream DSL user signals from the active DSL lines. The generated FEXT cancellation coefficients are used in a manner analogous to in-domain FEXT data collected from the active lines during training, tracking, etc.

15 Claims, 15 Drawing Sheets

(56) References Cited

U.S. PATENT DOCUMENTS

2009/0207985 A1\* 8/2009 Cioffi et al. ............... 379/93.01
2011/0058468 A1\* 3/2011 Singh et al. ................. 370/201

OTHER PUBLICATIONS

Ginis et al. "Vectored-DMT: A FEXT Canceling Modulation Scheme for Coordinating Users," Proceedings of IEEE ICC 2001, vol. 1, Helsinki, Finland, pp. 305-309, Jun. 2001.

\* cited by examiner

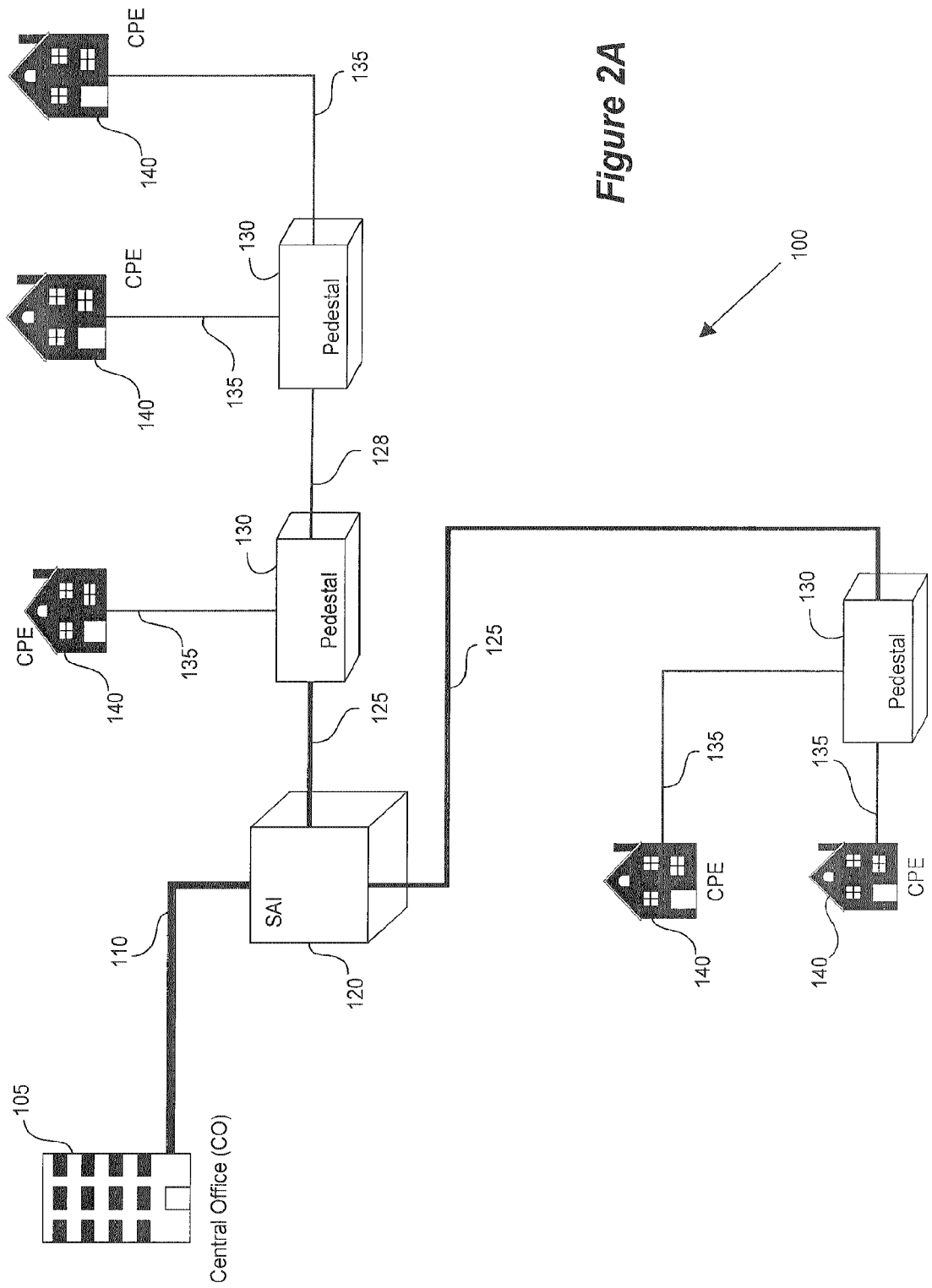

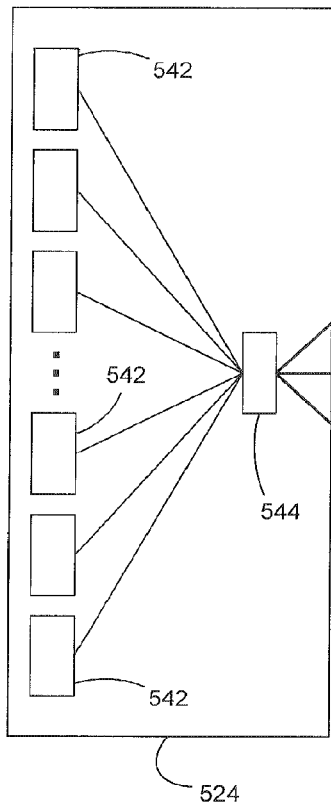
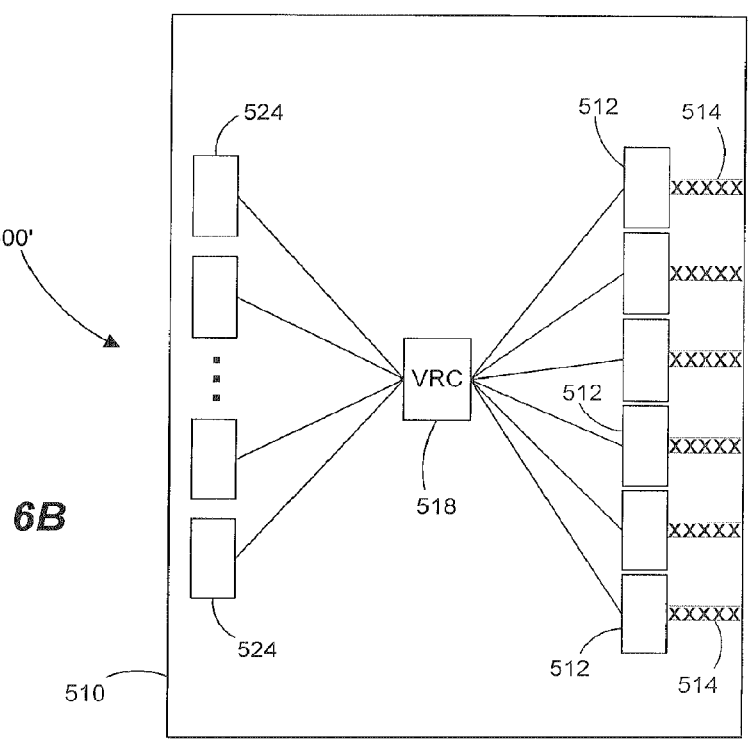
*Figure 6A*
*Figure 6B*

*Figure 14*

| Sub-Field Names | Sub-Field Length (bits) | Parameter Description | Field Length (bits) | Field Name |
|---|---|---|---|---|
| Ports In Packet | 16 | 16-bit map of ports included in packet. LSB=port 0 | 16 | Ports in Packet |
| Superframe Index | 15 | this allows pilot sequence lengths up to 1024. Index resets to zero at start of Pilot Symbol Sequence. | 24 | Index |
| Symbol Index | 9 | 0:255=data frames, 256= sync frame, 257-511 undefined | | |
| Band StartBin Index | 16 | first tone of band | | Bin Range |
| Band StopBin Index | 16 | last tone of band | 32 | |
| Port 0 Data | 2*b | b=configured FFT/IFFT data precision, port 0 first | | StartBin Payload |
| Port 1 Data | 2*b | | 2*N*b | |
| ... | ... | | | |
| Port N-1 Data | 2*b | | | |
| Port 0 Data | 2*b | b=configured FFT/IFFT data precision | | StartBin+1 Payload |
| Port 1 Data | 2*b | | 2*N*b | |
| ... | ... | | | |
| Port N-1 Data | 2*b | | | |
| ... | ... | ... | ... | ... |
| Port 0 Data | 2*b | b=configured FFT/IFFT data precision | | StopBin Payload |
| Port 1 Data | 2*b | | 2*N*b | |
| ... | ... | | | |
| Port N-1 Data | 2*b | | | |
| CRC | 16 | Not required if included in Serdes protocol. Can pad Payload to make entire payload 16 bit multiple. | 16 | CRC |

# ALIEN INTERFERENCE REMOVAL IN VECTORED DSL

CROSS-REFERENCE TO RELATED APPLICATIONS

This application is a Continuation of U.S. patent application Ser. No. 13/058,477, (Now U.S. Pat. No. 8,619,843), filed Feb. 10, 2011, which is the National Stage of International Patent Application of PCT/US2009/053235, filed Aug. 8, 2009, which claims the benefit of U.S. Provisional Patent Application Ser. No. 61/088,430, filed Aug. 13, 2008, each of which is hereby incorporated by reference in its entirety.

TECHNICAL FIELD

The present invention relates generally to the field of vectored DSL communication systems.

BACKGROUND

Digital Subscriber Line (DSL) communications suffer from various forms of interference, including crosstalk and various types of noise, such as radio frequency interference (RFI), electrical noise, etc. Various techniques have been developed to combat crosstalk interference and its deleterious effects on data transmission. Vectored DSL has been one such measure in development for some time. Vectored DSL systems remove crosstalk from "in-domain" sources, that is crosstalk caused by DSL signals transmitted on DSL lines that are part of the vectored DSL system. Alien-source interference (that is, interference from sources outside a vectored DSL system) include alien DSL line crosstalk, RFI, electrical motor operation, etc. Systems, apparatus and methods that provide improved vectored DSL performance and operation by removing some or all of any existing alien interference in the vectoring of each DSL line would represent a significant advancement in the art.

SUMMARY

Embodiments of the present invention include apparatus and methods pertaining to the reduction and/or elimination of correlated alien interference from active lines in a vectored DSL system. Pseudo signals are collected from lines that provide a "noise-only" signal. For example, some lines do not carry upstream DSL transmissions using the relevant frequencies used in the active lines in the vectored DSL system and these "inactive lines" can be used to obtain the pseudo signals. Also, pseudo signals can be derived from common-mode voltage signals from active lines. The pseudo signals include FEXT from the vectored system active lines, as well as correlated alien interference from outside the vectored system. By treating the correlated alien interference in the same way that DSL vectoring training and tracking signals are treated in generating FEXT cancellation coefficients for vectoring, the correlated alien interference can be integrated into the FEXT cancellation coefficients matrix and used during vectoring to help reduce or eliminate the effects of the correlated alien interference on the upstream signals of the vectored system's active lines. The inactive lines can be twisted copper pairs that have no active downstream-end modem or other device, such as a CPE device, where the inactive lines effectively act as a correlated alien interference gathering tool.

Training, tracking or other test signals can be sent upstream in the active lines to generate output signals on the active lines that are used to generate FEXT cancellation coefficients. Pseudo signals can be collected from one or more inactive lines and processed like active line test signal output signals to remove the active line FEXT. The remaining signal information is used as are the active lines' output signals to map interference effects in the vectored system. In some embodiments, the correlated alien interference data generated from the pseudo signals is integrated into vectoring by adding one or more columns to a FEXT cancellation coefficients matrix, thus treating the correlated alien interference as another disturber in the FEXT-affected vectored DSL system.

BRIEF DESCRIPTION OF DRAWINGS

The present invention will be readily understood by the following detailed description in conjunction with the accompanying drawings, wherein like reference numerals designate like structural elements, and in which:

FIG. 2A is a DSL topology in which embodiments of the present invention can be implemented.

FIG. 6A and FIG. 6B are block diagrams of one or more embodiments of vectored DSL systems in which embodiments of the present invention can be implemented.

FIG. 14 is an example of a packet structure according to one or more embodiments of the present invention.

DETAILED DESCRIPTION

Figure 1:
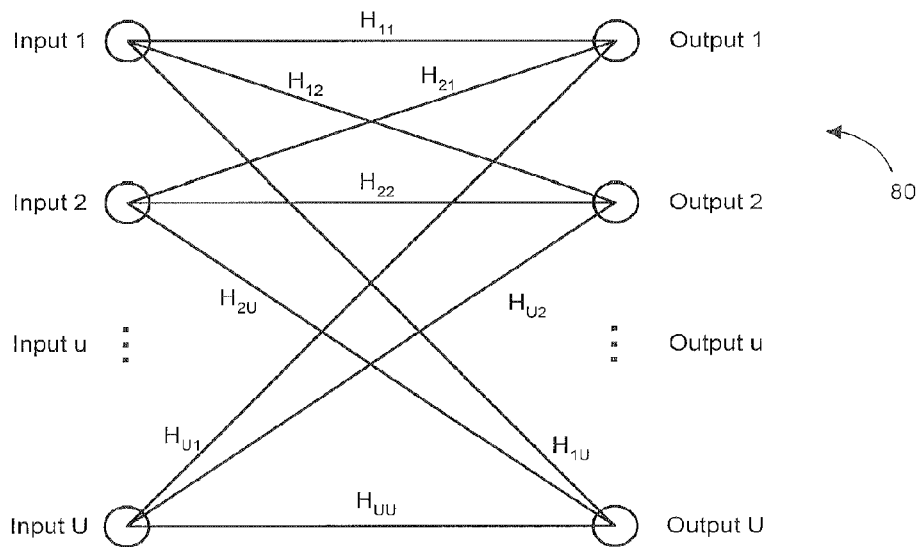
FIG. 1 is a (MIMO) system in which embodiments of the present invention can be implemented.

The following detailed description will refer to one or more embodiments, but the present invention is not limited to such embodiments. Rather, the detailed description and any embodiment(s) presented are intended only to be illustrative. Those skilled in the art will readily appreciate that the detailed description given herein with respect to the Figures is provided for explanatory purposes as the invention extends beyond these limited embodiments.

Certain terms are used throughout the description and claims to refer to particular system components. This disclosure does not intend to distinguish between components that differ insubstantially. Phrases such as "coupled to" and "connected to" and the like are used herein to describe a connection between two devices, elements and/or components and are intended to mean physically and/or electrically either coupled directly together, or coupled indirectly together, for example via one or more intervening elements or components or via a wireless connection, where appropriate. The term "chip" refers broadly to a hardware device that operates in a prescribed manner, for example to process data, and can include various types of such devices (for example, a field-programmable gate array (FPGA), a digital signal processing (DSP) chip, an application-specific integrated circuit (ASIC), an integrated circuit (IC), etc.). The term "system" refers broadly to a collection of two or more components and may be used to refer to an overall system (e.g., a computer and/or communication system or a network comprising one or more computers, communication components, etc.), a subsystem provided as part of a larger system (e.g., a subsystem within an individual computer), and/or a process or method pertaining to operation of such a system or subsystem. In this specification and the appended claims, the singular forms "a," "an," and "the" include plurals unless the context clearly dictates otherwise. Unless defined otherwise, technical and scientific terms used herein have the same meanings that are not inconsistent to one of ordinary skill in the art relevant subject matter disclosed and discussed herein.

Reference in the specification to "some embodiments," "one embodiment," "an embodiment," etc. of the present invention means that a particular feature, structure or characteristic described in connection with such embodiment(s) is included in at least one embodiment of the present invention. Thus, the appearances of the noted phrases in various places throughout the specification are not necessarily all referring to the same embodiment.

In the absence of crosstalk and/or other material interference, the existing copper telephone infrastructure can in theory be utilized to carry from tens to hundreds of megabits per second over distances up to approximately 5000 feet using discrete multitone (DMT) digital subscriber line (DSL) modem technology. DMT modems divide the available bandwidth into many sub-carriers that are synchronized and independently modulated with digital QAM data to form an aggregate communication channel between the network and subscriber. DMT-based DSL systems typically use Frequency Division Multiplexing (FDM) and assign particular sub-carriers to either downstream transmissions (that is, from network/CO to subscriber/user) or upstream transmissions (from subscriber/user to network/CO). This FDM strategy limits near end crosstalk (NEXT). DMT systems are typically very robust in the presence of RFI and other types of frequency-selective noise (or interference) or channel dispersion, because each sub-carrier can be independently modulated with an appropriate amount of data and power in order to meet the system requirements and the desired bit error rate. However, such RFI, noise, etc. nevertheless can have a significant negative impact on the performance of a DSL system. As is well known to those skilled in the art, impulse noise typically spans all relevant frequencies, while RFI usually affects only a narrow range of frequencies.

Typical telephone binder cables contain 10 to 50 unshielded copper twisted pairs (these binders are then bundled into larger cables). Due to manufacturing variations and imperfect cable installation (for example, bending, etc.), significant levels of far-end crosstalk (FEXT) can occur between twisted pairs in a binder (and between adjacent binders). More particularly, as a result of cable construction, installation and deployment, each twisted pair is physically adjacent to other twisted pairs in and/or outside a binder for a significant distance in the cable. While FEXT levels vary as a result of manufacturing, the net result is that virtually every copper pair imparts some amount of FEXT onto virtually every other copper pair in the cable.

As illustrated in FIG. 1, a multiple-input multiple-output (MIMO) system 80 in which embodiments of the present invention can be implemented is characterized by system (or channel) responses from each input to each output of the system. For linear systems, the system responses are linear functions. For example, inputs 1 through U and outputs 1 through U have system responses $H_{ij}$ (FEXT channel responses/coefficients for i≠j, and direct channel responses/coefficients for i=j), namely $H_{11}, H_{12}, \ldots, H_{1U}, H_{U2}, \ldots, H_{U1}, H_{U2}, H_{UU}$. Any given Output is thus the aggregate response from every input (1 to U) to that output. To communicate data reliably and at high rates over such a MIMO system, the system responses must be known. To identify these system responses, $H_{ij}$ with (i,j=1:U), the inputs can be stimulated with test signal input data (for example, pilot and/or orthogonal training or tracking sequences, as is well known to those skilled in the art) and the test signal output data of the system received, observed, measured and/or collected by DSLAM modems and/or other upstream-end devices. The data received or computed by a receiving modem is typically an error signal. That is, each modem knows what the training or tracking data inputs are and what the output signal is that the modem should receive if no crosstalk is present. The receiving modem calculates an error signal that is representative of the difference between the expected transmission output and the actual (FEXT perturbed) transmission output. These error signals are collected by the DSLAM as an indication of a given DSL line's upstream FEXT interference topography. The DSLAM correlates these error signals from all of the relevant lines to determine the $H_{ij}$ (k) coefficients that represent crosstalk effects in the relevant DSL lines.

In such a DSL MIMO system, the direct system responses, $H_{ii}$, correspond to the desired modem response signal for a single sub-channel from each modem u's own twisted pair and the remaining terms, $H_{ij}$, where i≠j, correspond to FEXT from other in-domain twisted pairs in the binder cable (and sometimes from a different cable). Such a MIMO system exists in both the upstream and downstream directions where groups of tones are assigned to either upstream or downstream communication (for example, whether or not in a continuous range of tones, there is a discrete set of frequencies used for upstream transmissions, that is an "upstream frequency set," just as there is such a set for downstream transmissions). As noted above, the upstream and downstream directions use frequency division multiplexing to avoid excessive impact from NEXT. Such a crosstalk canceling DMT DSL modem system is called vectored DSL. Vectoring is well known to those skilled in the art, and is explained in more detail in "Vectored Transmission for Digital Subscriber Line Systems," by G. Ginis and J. Cioffi (IEEE JSAC special issue on twisted-pair transmission, Vol. 20, Issue 5, pp. 1085-1104, June 2002); and "Vectored-DMT: A FEXT Canceling Modulation Scheme for Coordinating Users," by G. Ginis and J. Cioffi (Proceedings of IEEE ICC 2001, Vol. 1, Helsinki, Finland, pp. 305-09, June 2001), both of which are incorporated by reference herein for all purposes.

The basic principle behind vectoring is coordinating communications between every twisted pair in a telephone cable. Because all twisted pairs in the cable terminate in one central location known as a DSLAM (DSL access multiplexer), the DSLAM (or other upstream-end DSL device to which vectored lines are connected) is the natural location to coordinate this communication (though other upstream-end locations may be used effectively). To vector the modems effectively, the modems are synchronized to the same DMT symbol clock and have synchronized training/tracking periods with pre-arranged test signal input data patterns (unique to each modem and used as training signals or tracking signals) to allow victim modems to identify the crosstalk channel characteristics between particular disturber-victim modem pairs. As will be appreciated by those skilled in the art, there are a variety of techniques for identifying crosstalk in such systems, including one or more that may be described in various applicable standards pertaining to DSL systems and their implementation.

Using "crosstalk topography" or mapping, which typically is viewed or considered as a matrix having coefficients representing the various interactive/crosstalking relationships between DSL lines determined during training, tracking and the like, transmit pre-compensation (for example, precoding) can be used in the downstream direction (from DSLAM to customer site). In effect, the transmit waveform for a given modem is pre-distorted based on the transmit waveforms being used by many other modems (that is, the other modems whose FEXT materially affect the given modem's signals), such that the interfering FEXT is effectively balanced (counteracted) and the FEXT's effects thus eliminated by the time the pre-distorted modem signal reaches its customer side terminus. In the upstream direction (from customer site to DSLAM), MIMO (multiple-input-multiple-output) spatial filtering is used at the DSLAM to cancel upstream FEXT at the upstream receive side. Identification and tracking of the FEXT filter cancellation coefficients may be performed using the LMS (Least Mean Squares) adaptive algorithm or other Least-Squares type methods, as is well known to those skilled in the art. Training data (for example, training signals) to support identification of the FEXT filter coefficients may be integrated into a modified version of a known DSL standard, such as VDSL2.

Various examples of DSL systems using one or more embodiments of the present invention will be described herein in connection with a DSLAM coupled to a number of CPE modems. However, as will be appreciated by those skilled in the art, embodiments of the present invention can be used in other DSL transmission and vectoring settings and structures. For example, a DSL line may couple a DSLAM to an intermediate DSL line device such as an optical networking termination point (ONT), a signal repeater, etc. Likewise, the upstream end of a DSL line might terminate with a device or apparatus other than a DSLAM alone. That is, embodiments of the present invention can be used in a variety of DSL settings in which the DSL line terminates with a downstream transceiver and an upstream transceiver.

A typical DSL topology 100 in which embodiments of the present invention can be implemented is presented in FIG. 2A. As can be seen, a central office (CO) 105 provides high bandwidth transmission via a feeder 110 (which can be a high-bandwidth link, such as fiber optic cable, or a binder with a number of copper lines running through it). The feeder 110 may connect the CO 105 to a serving area interface (SAI) 120 (which may, for example, be an optical networking unit or ONU). From interface 120, a number of copper lines 125 may then extend to a pedestal 130 near one or more customer premises equipment (CPE) locations 140. Such pedestals are common on each block of a street or neighborhood, for example. In some cases, pedestals are intermediate points between a CO, SAI and/or other pedestals. For example, in FIG. 2A, an inter-pedestal link 128 continues lines that do not divert to the line(s) 135 of a customer 140 on to another pedestal and thus subsequently to one or more other CPEs.

Pedestals offer a cross-connection point between lines going to one or more customer premises (often referred to as a "drop") and the remaining lines that may continue to other pedestals. Typically, there are 2-6 lines in the "drop" segment to each customer, providing extra copper for the contingency of one or more customers later demanding multiple phone services. The cable back to the ONU or central office usually does not have 2-6 times as many phone lines as would be needed by all the customers (because not all customers would have demanded that many phones). However, the pedestal drops typically have extra copper that can be adapted to function as one or more inactive lines, as defined below, usable in connection with embodiments of the present invention.

Figure 2B:
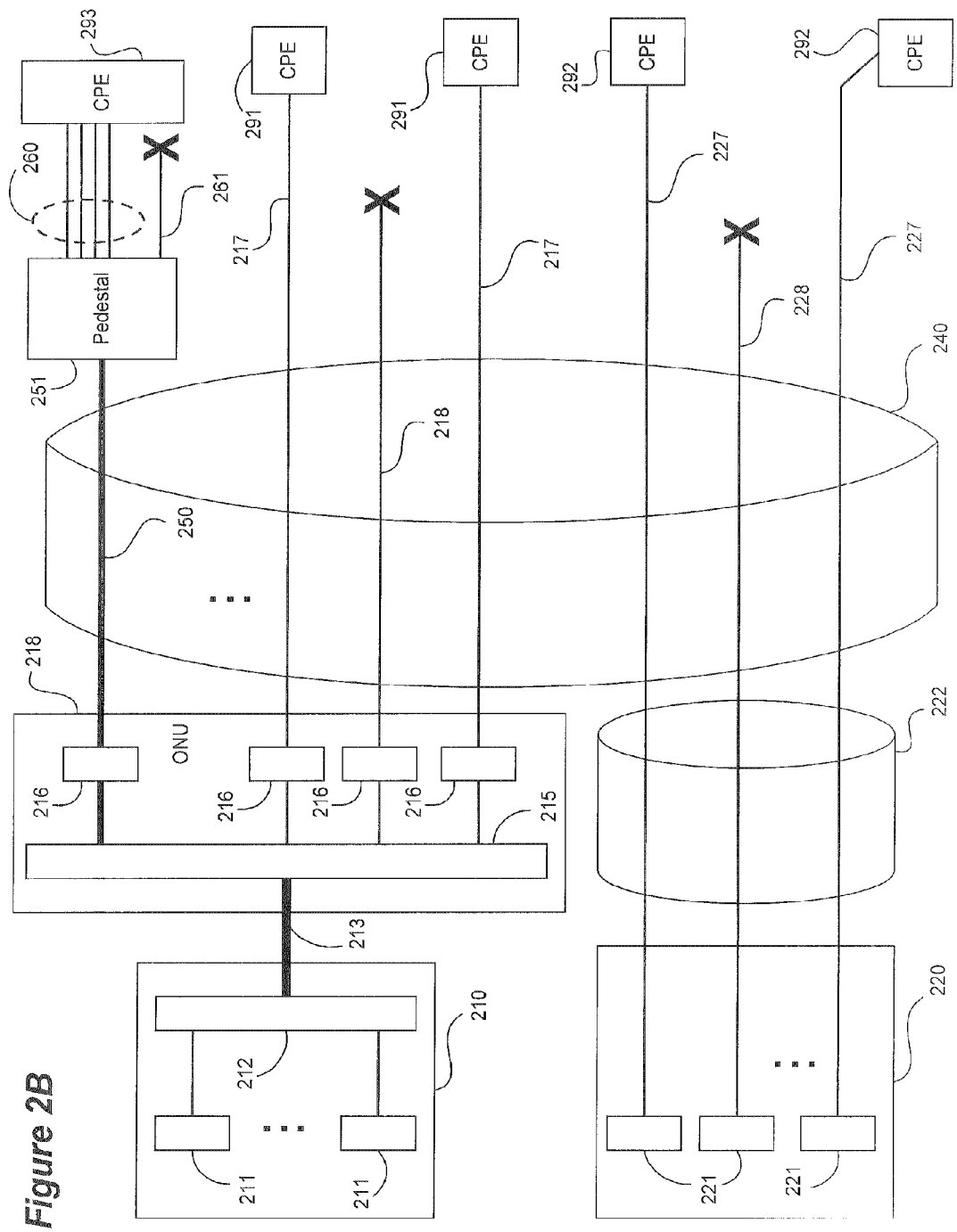
FIG. 2B is a DSL deployment in which embodiments of the present invention can be implemented.

Another exemplary DSL deployment scenario in which embodiments of the present invention can be implemented is shown in FIG. 2B. All the subscriber loops of users 291, 292, 293 pass through at least one common binder. Each user is connected to CO units 210, 220 through a dedicated line. In FIG. 2B some users 291 are connected to CO unit 210 using a combination of optical fiber 213 and twisted copper pairs 217, which is commonly referred to as Fiber to the Cabinet (FTTCab) or Fiber to the Curb. Signals to and from transceivers 211 in CO 210 are converted by optical line terminal 212 and optical network terminal 215 in CO 210 and optical network unit (ONU) 214. Modems 216 in ONU 214 act as transceivers for signals between the ONU 214 and users 291. However, one or more inactive lines 218 (as defined below) can be present, where such inactive lines have an upstream-end modem 216 (for example, a modem port, DSLAM, line card, etc.) in ONU 214, but do not connect to active CPE modems or the like, being either not in use or in use for services other than DSL transmissions in the relevant frequency range(s). The lines 227 of users 292 are copper twisted pairs only, a scenario referred to as Fiber to the Exchange (FTTEx). The topology can be such that fiber-fed "cabinet" lines and exchange lines can be mixed in the same binder. As can be seen in FIG. 2B, the lines from CO 220 to users 292 share binder 222, which is not used by the lines between CO 210 and users 291. Moreover, another binder 240 is common to all of the lines to/from CO 210 and CO 220 and their respective users 291, 292, 293. One or more inactive lines 228 can be part of the lines emanating from CO unit 220, such that an upstream-end modem 221 is connected to an inactive line 228, but no relevant DSL activity takes place on any line 228. Moreover, a group of 4 active DSL lines 260 can be dropped from a pedestal 251 to CPE 293. The drop of active loops 260 likely provides interference ingress similar to that imposed upon any active DSL lines in group 260 and/or in other nearby active lines. Another example of inactive lines is found in the drop from pedestal 251, where one or more inactive lines 261 from pedestal 251 can be used in embodiments of the present invention.

Receive-side upstream vectoring can be performed at the DSLAM side using MIMO filtering, as all DSLAM-side modems terminate in one location and the necessary FEXT data is available (or can be more easily obtained) to perform crosstalk cancellation. Downstream Vectoring must be performed using transmit pre-compensation, because CPE modems are widely dispersed in different subscriber locations and FEXT cancellation is thus not possible at the CPE side. Because FEXT channel characteristics can vary over time, these channel estimates typically are tracked and updated regularly over time. Most DSL frequency band schemes are biased in favor of higher downstream communication rates at the expense of lower upstream communication rates (for example, by a ratio of up to 10 to 1). Thus upstream communication inhibition by upstream crosstalk may constitute a significant effect relative to total available upstream data rate.

A coordinated vectored DSL system can cancel FEXT effectively for modems that are part of the MIMO vectoring system. However, such a vectoring system cannot cancel FEXT caused by signals to/from modems that are not part of the vectoring system (these "external" signals are referred to as "alien FEXT"), nor can the vectoring system cancel interference caused by other alien sources such as nearby electrical equipment, electric motors, RFI, etc. This inability to cancel such alien interference typically reduces performance gains otherwise available from a vector processing system. Embodiments of the present invention address "removable alien interference" present on active vectored DSL lines. "Non-removable alien interference" can affect active and inactive DSL lines, but the nature of this type of interface (for example, thermal noise, electronics noise, etc.) means that it such noise is unique to a given line and uncorrelated among the active lines in a given vectored DSL system. The removable alien interference is noise/interference correlated among the active and inactive lines in a given group of lines (for example, FEXT interface, RFI, etc.) that include one or more of the active DSL lines in the vectored system. In this disclosure and the claims that follow, "alien interference" and "alien interference data" used in connection with vectoring refer to removable alien interference or noise.

Some embodiments of the present invention utilize techniques and apparatus to exploit one or more spare telephone lines (a telephone line being a twisted pair) that are "inactive." An inactive line is a DSL, telephone or other twisted pair that is coupled to a DSLAM or other upstream-end device (e.g., modem, modem port, line card, etc.) and that is not transmitting upstream signals, data, signals, etc. with any frequencies used by the relevant vectored DSL system's active lines. Other embodiments of the present invention use active line common-mode voltage signals to obtain pseudo signals, as discussed in connection with FIGS. 9A, 9B and 9C, below. Throughout this disclosure of the present invention, the use of pseudo signals from inactive lines can be substituted using pseudo signals obtained from common-mode voltage signaling that is processed to cancel transmitted DSL signals, telephone signals, etc. and to yield interference-only signals that are used as pseudo signals.

Despite the absence of a DSL signal transmitted by a CPE or other downstream-end modem in the relevant frequency set, a "pseudo signal" can nevertheless be detected at an upstream-end modem connected to an inactive line. This pseudo signal contains both alien and in-domain interference impinging on the inactive line, but does not include any user data because no CPE modem is transmitting such data upstream to the DSLAM. In-domain pseudo signal interference (i.e., crosstalk from active DSL lines in vectored DSL system) can be processed and removed from a pseudo signal using vectoring techniques just like in-domain crosstalk is removed from active DSL lines during vectoring. The residual signal data after in-domain interference is removed is "alien interference data" captured by the inactive line. This alien interference data is treated in embodiments of the present invention like test signal output data (e.g., training, tracking and/or other similar crosstalk-mapping signals) received by a DSLAM on an active DSL line and incorporated into the vectored DSL system's vectoring matrix of line data. This inactive line pseudo signal's alien interference data is used to reduce or eliminate the effects of correlated alien interference that affects the inactive line and any similarly-situated active DSL lines. As can be seen from FIG. 2B, depending on the orientations of various inactive lines (or common-mode voltage signal source lines), different types of alien interference might be detectable with a given inactive or common-mode voltage signal source line and thus treatable with pseudo signals from lines in different positions in the vectored DSL system.

In another embodiment of the present invention, as discussed in more detail in connection with FIGS. 9A, 9B and 9C, below, common-mode voltage signals (adding together the single-ended voltage signals reference to ground from the two conductors of the twisted pairs) effectively cancel out the equal magnitude/opposite polarity components of the differential voltage signal. The residual voltage signal in such common-mode voltage signals can be used as a pseudo signal in embodiments of the present invention. These common-mode voltage signals can be derived from common-mode voltage signal source lines that can include active lines in the vectored DSL system, other active DSL lines outside the vectored system, and/or any other lines that carry differential voltage signals for whatever purpose, so long as each common-mode voltage signal source line is connected to an upstream-end modem that can process common-mode voltage signals to generate pseudo signals (e.g., as in FIG. 9C).

Embodiments of the present invention comprise apparatus, methods, etc. for canceling alien interference (e.g., alien FEXT, RFI, electrical noise, etc.) by using one or more spare copper pairs whose pseudo signals are processed to generate alien interference data that is integrated like real DSL data signals into the vectoring system. The spare pairs are inactive lines, as defined above, and have the unique attribute of not carrying any "real" DSL signals transmitted by a downstream-end modem connected to the inactive line, only interference. When the alien interference data harvested from these pseudo signals are processed like active line data in the vectoring system (either upstream or downstream), known and/or unknown interference sources such as in-domain FEXT can be identified and cancelled (as would be done for any other copper pair in the vectoring system).

Embodiments of the present invention are related to and are an extension of noise de-correlation, in which the multiplicity of received signals are weighted linearly and combined in accordance with a set of weights that are pre-computed based on the observed statistics of these signals. As is well known to those skilled in the art, the characterization of signals involves estimating a set of covariances. From this set, the set of noise de-correlation weights (most conveniently organized as a matrix) can be computed as the matrix square-root of the covariances, also organized as a matrix.

Since the correlating process in the telephone loop plant also involves the spare pairs, the pseudo signals from the spare pairs are included in the de-correlation process, so that the resulting error sequences on all such processed signals are mutually uncorrelated. Equivalently it can be seen that signals from the spare pairs form an estimate of the error sequences on the active line pairs, and so the effect of the noise can be reduced or eliminated. Even though the spare pairs carry no real DSL signal (that is, a signal transmitted by a DSL modem at the downstream end) and are not used for data transmission, the signals received on these pairs provide information about the alien noise that is coupled on to the other pairs.

Figure 3:
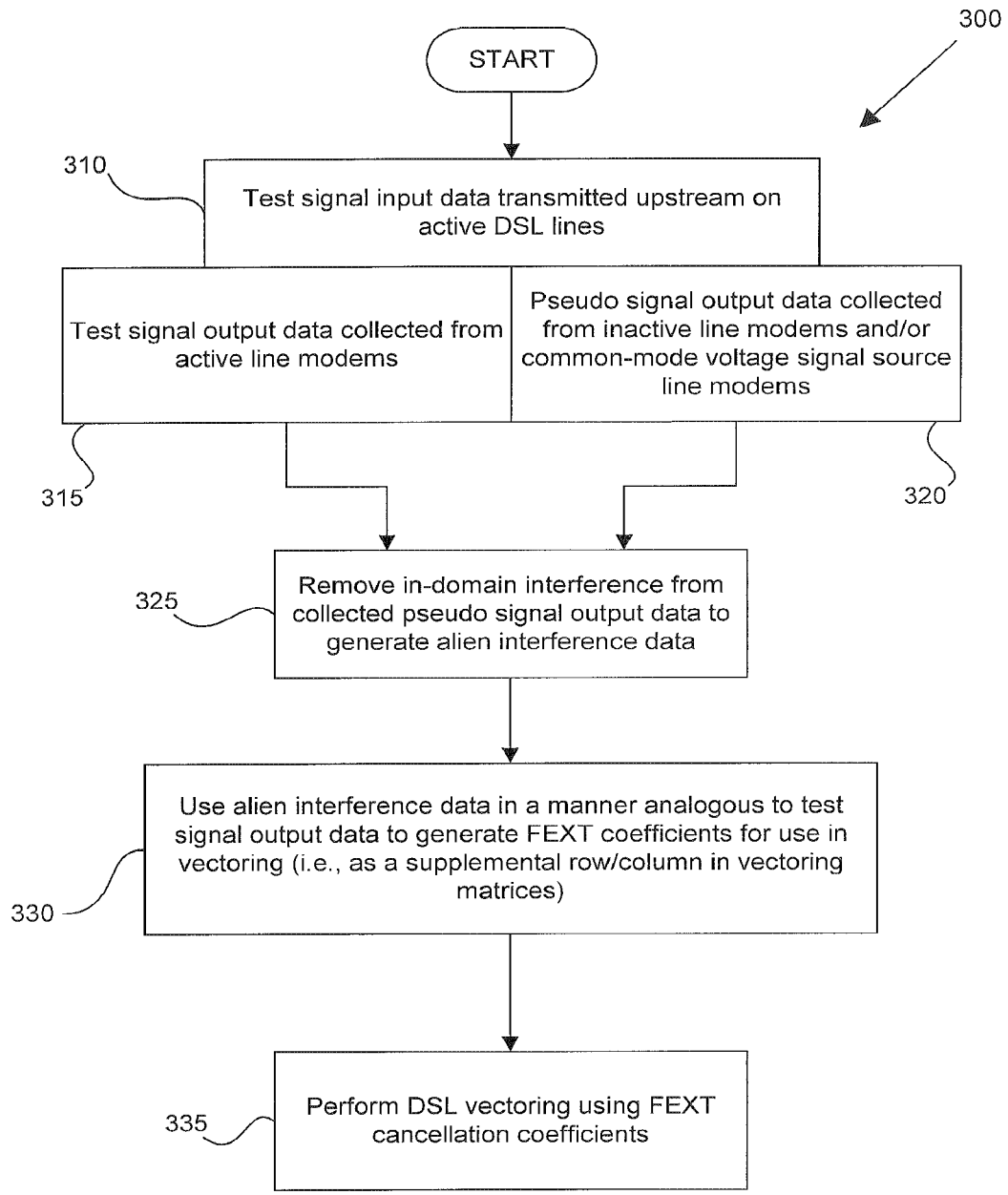
FIG. 3 is a flow diagram illustrating one or more embodiments of the present invention.

More specifically, an embodiment is shown in FIG. 3 where a method 300 for utilizing pseudo signals harvested from one or more inactive lines is shown. Upstream test signal input data is transmitted at 310 (for example, in connection with training or tracking in a DSL system) on active DSL lines in a vectored DSL system. A DSLAM (or other upstream-end device) collects test signal output data from active line modems at 315 and collects pseudo signal output data (i.e., signals collected as inactive line or common-mode voltage signal source line outputs) from inactive and/or common-mode voltage signal source lines at 320 (providing any amplification or other needed processing for collected pseudo signals). Again, whether from inactive lines that do not transmit DSL signals or from common-mode voltage signal source lines, pseudo signal output data consists of in-domain FEXT and alien interference. At 325 in-domain interference is removed from collected pseudo signal data, leaving only alien interference data. FEXT coefficients are generated at 330 using the alien interference data corresponding to pseudo signal source lines, just as if the alien interference data was transmitted test signal output collected from a vectored DSL line. At 335 DSL vectoring is performed using the FEXT cancellation coefficients on a per tone basis. This vectoring can be performed using a FEXT cancellation matrix having at least one more column (or row) in addition to the columns representing the active DSL lines, due to the presence of one or more columns (rows) for removal of alien interference. Typically there will be an additional FEXT coefficient matrix column for each pseudo signal source line, though some alien interference data might be combined into fewer columns. As will be appreciated by those skilled in the art, as noted above, multiple inactive lines can be uses to generate alien interference data for more than one segment of a DSL plant and/or for subsets of lines in the vectored DSL system that might share alien interference sources with some, but not all of the active lines in the vectored DSL system.

The frequency-domain signal stream from an inactive line spare pair can be received using a portion of an existing upstream-end DSL modem port that is dedicated to the spare pair, for example the analog front-end, amplifier, front-end filters and FFT blocks. In this case, the A/D converter clock can be slaved to the phase-locked sampling phase from an active modem port on the same circuit board subsystem (or in the same multi-port modem chipset).

Figure 4:
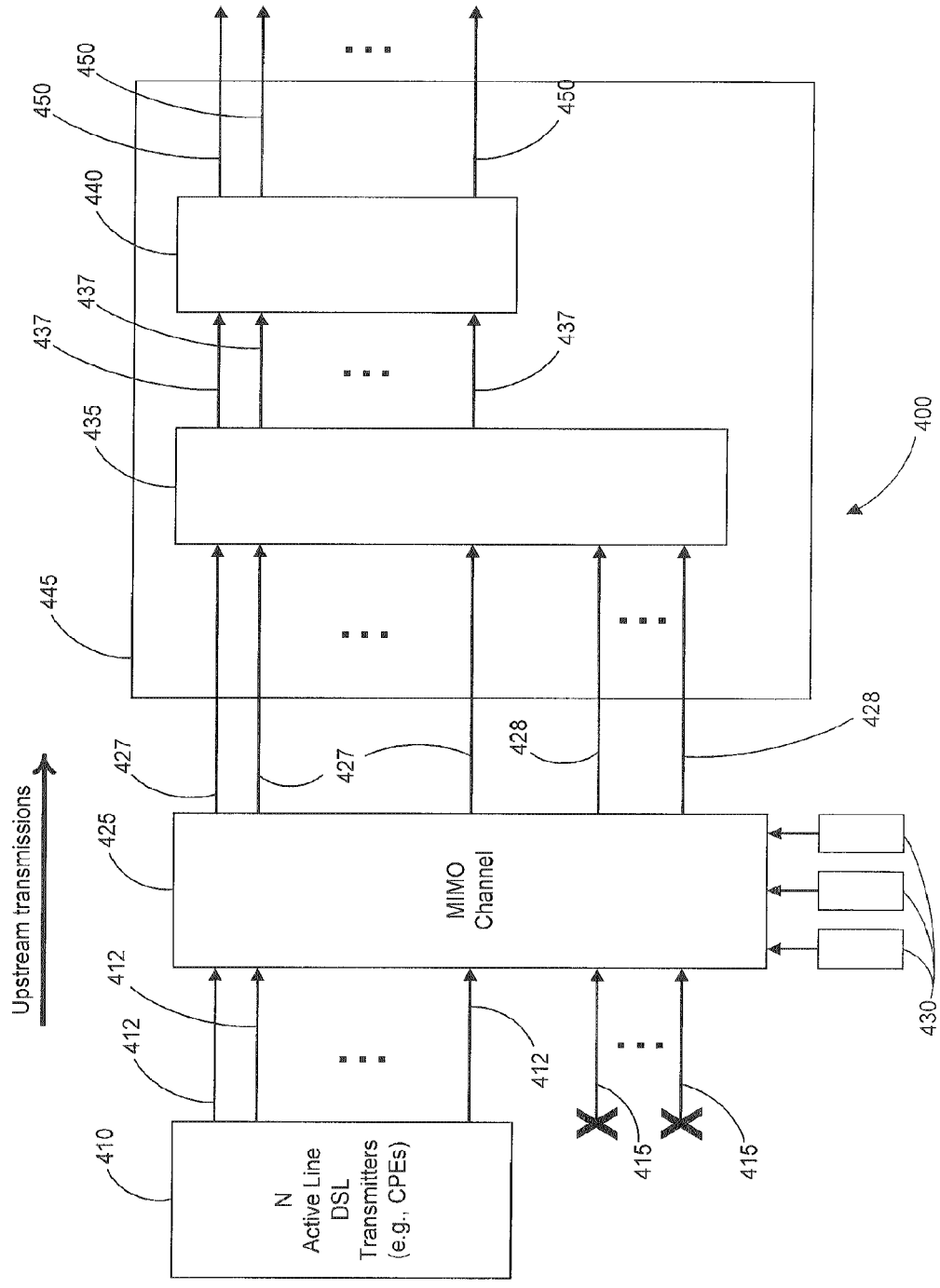
FIG. 4 is a block diagram of an exemplary vectored DSL system implementing one or more embodiments of the present invention.

An exemplary embodiment of the present invention is shown in the vectored DSL system 400 of FIG. 4. At the downstream end of system 400 there are N DSL transmitters (e.g., CPEs) transmitting upstream DSL user signals on N active DSL lines 412. There are also M inactive lines 415 that do not carry DSL user signals in the upstream frequency set used by active lines 412. All (N+M) lines 412, 415 are treated as a MIMO channel system 425 affected by one or more removable alien interference sources 430. The output signals 427 of the N active DSL lines are received by an upstream-end receive-side vectoring system that includes a de-correlating processor 435. Moreover, pseudo signals 428 received from the M inactive lines are likewise sent to processor 435, which uses an N×(N+M) de-correlating matrix to remove alien interference from the N active DSL lines' signals. The N de-correlated active line signals 437 are then sent to an optional decision feedback unit 440 using an N×N matrix for further processing, after which vectored DSL data 450 is provided.

Figure 5:
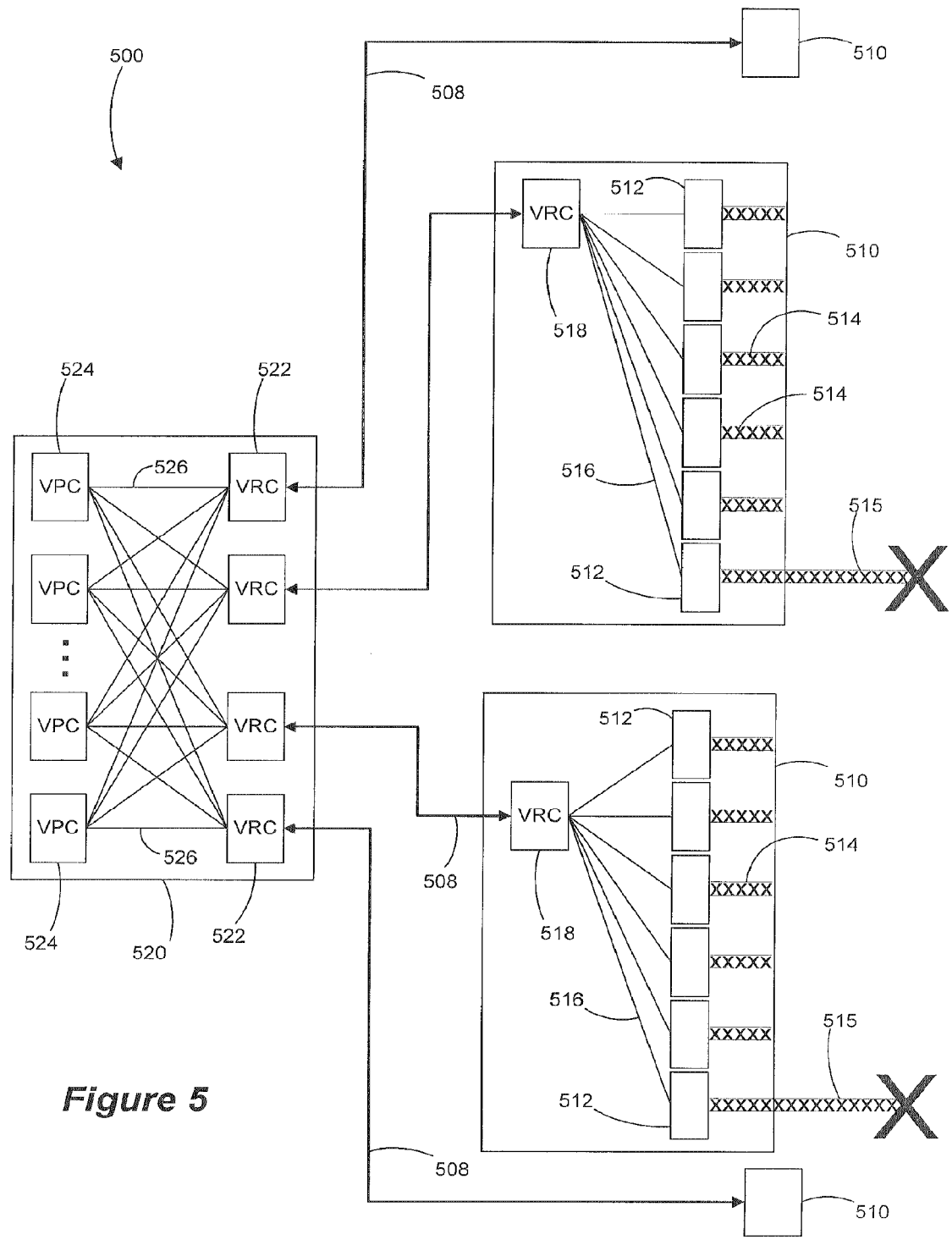
FIG. 5 is a block diagram of a vectored DSL system according to one or more embodiments of the present invention.

Embodiments of the present invention can be implemented in various vectoring systems, including one or more embodiments disclosed in International Application No. PCT/US09/46801, filed 10 Jun. 2009, by Vector Silicon, Inc., entitled VECTORED DSL CROSSTALK CANCELLATION, which is incorporated herein by reference in its entirety for all purposes. One embodiment of a vectoring system 500 similar to that in the above-referenced international application is illustrated in FIG. 5 and can be used in connection with the system of FIG. 4, for example, and includes several line cards 510 that each contain DSL modems 512 (for example, multi-port devices) controlling communications on active twisted-pair lines 514. Several inactive lines 515 also are connected to upstream-end modems 512 in line cards 510. Multiple line cards 510 can be connected via a high speed communication apparatus, such as XAUI lines 508 or the like to a vectoring control entity (VCE) that can be or include a centralized vectoring module 520 (which can be, for example, a vectoring card). XAUI is the standard for extending the XGMII (10 Gigabit Media Independent Interface) between the MAC and PHY layer of 10 Gigabit Ethernet (10 GbE) and such high-speed data communication lines 516 can be used to connect modems 512 to line card vector router components (VRC-Ls) 518. The VRC-Ls 518 form an abstraction layer for the modem 512, as the modem 512 needs to connect to only one VRC-L 518 and the complexity of the specific vectoring deployment (for example, number of ports, line cards, etc.) is thus hidden from each modem 512.

The vectoring data flow from each modem 512 to its respective VRC-L 518 includes frequency domain samples for downstream and upstream communications—that is, IFFT-input transmit data for downstream vectoring and/or FFT-output receive data for upstream vectoring. Pseudo signals from inactive lines 515 provide alien interference data to one or more VRC-Ls 518 as FFT-output receive data via the inactive lines' modems 512. The data returned to each modem 512 from the vectoring module 520 via a VRC-L 518 is the modem's crosstalk-adjusted (that is, vectored) IFFT-input and/or FFT-output data that is conditioned and/or processed to prevent and/or remove crosstalk interference from other vectoring system modems, as well as alien interference from external sources for received upstream signals. The VRC-L 518 in each line card 510 acts as an interface between that line card's modems 512 and the vectoring module 520. High-speed communication lines 508 (for example, 10-40 Gbps or higher optical or copper interconnect) network a VRC-L 518 on each line card 510 to a companion vectoring module vector router component (VRC-V) 522 on the vectoring module 520. The 10-40 Gbps interconnect is a common data communication requirement that can be implemented between the vectoring module 520 and each line card 510. This currently would mostly likely be an aggregation of 5 Gbps or 10 Gbps XAUI lines or similar, whether over the electrical backplane or the optical cable.

The VRC-Vs 522 on vectoring module 520 subdivide the modem vectoring data stream into sub-bands for subsequent crosstalk cancellation in one or more vector processors (VPCs) 524, as defined by system requirements. The vector processors may also be referred to as "vector processor components," "computational devices" and/or the like. That is, data is removed from a normal (that is, non-vectored) data stream in each modem and is reorganized into data bundles defined by frequency characteristics so that the data can be crosstalk-processed on a frequency basis (for example, tone-by-tone, groups of tones, etc.). Once processed, the data is then again reorganized from the frequency-based bundles used for crosstalk-removal processing and is reassembled for transmission/use by the modems.

For example, upstream and downstream bands can be vector routed by one or more VRCs (for example, a VRC-L/VRC-V pair) to individual VPCs. A vector router is a specialized data networking device or subsystem that implements a specialized "private" data network, which can be similar to an Ethernet network, for the purpose of efficiently moving vectoring data between modems and vector processors to avoid processing or data transmission bottlenecks. Packets of vectoring data can contain headers and/or other state information enabling efficient routing of the vectoring data over the data network without the need for dedicated links between each modem and vector processor device. To this end, a vector router also converts vector data packets from a format readily supplied by the modems into a format that is naturally utilized by the vector processors, then converting back again after vectoring has been performed (for example, interleaving and de-interleaving of the modem vectoring data stream). This task may be split between VRC-Ls and VRC-Vs, or performed in only one or the other, depending on the configuration. Alternately, VPC assignment can be based on evenly spaced sub-bands (independent of upstream and downstream band allocation). Data transmission between VRC-Vs 522 and VPCs 524 on the vectoring module 520 can be performed using high speed interconnect lines 526 (for example, XAUI or the like).

Other types of packets can be used in connection with embodiments of the present invention. For example, along with the vector data packets described, vector error packets, vector configuration packets and vector control packets can be sent throughout the vectoring data network to configure, adjust, etc. the vectored DSL system as appropriate (for example, to configure, control or synchronize modems chips or to configure, control or synchronize vector processors). Any of the packets described herein can include one or more modem port identifiers, a modem chip identifier, a line card identifier, a chassis identifier, or information identifying at least one DMT tone range so that tracking and addressing of the packets is achieved.

For vector request packets, the payload data can include inverse fast Fourier transform samples for a plurality of modem ports and tone sets identified in the request packet header, fast Fourier transform samples for a plurality of modem ports and tone sets identified in the request packet header, downstream frequency domain data for a plurality of modem ports and tone sets identified in the request packet header, and/or upstream frequency domain data for a plurality of modem ports and tone sets identified in the request packet header. Additional fields and components of the packet can be utilized (for example, a cyclic redundancy check or CRC). A vector error packet can include upstream training error samples for the modem ports and tone sets identified in the request packet header, upstream tracking error samples for the modem ports and tone sets identified in the request packet header, upstream DMT sync symbols for the modem ports and tone sets identified in the request packet header, downstream training error samples for the modem ports and tone sets identified in the request packet header, downstream tracking error samples for the modem ports and tone sets identified in the request packet header, and/or downstream DMT sync symbols for the modem ports and tone sets identified in the request packet header.

FIG. 14 shows one embodiment of a vectoring data packet format defined for modems serving N ports and vectoring data transmitted to/from the modems over the DSL vectoring data network (also referred to as the "private network," "routing subsystem," "vector routing network," "special network" or the like) has this format. The VRC-L adds a header on such a packet to identify the modem chip and line card, so the source of the data is known as the packet flows to the VRC-V (or, if no VRC-V is on the vectoring card, then to whatever destination is used in the vectoring card) and then on to the VPC/VPU. As vector-processed data comes back from the vectoring card to the VRC-L (or, if no VRC-L is used, then to the modems from which the vectoring data was extracted and transmitted), this header is removed before distributing the packets back to the appropriate modem chips. The VRC-L and/or VRC-V may optionally re-assemble packets from multiple modem chips into a format for use by the VPCs, depending on how the modems provide the data. Use of such packets and headers (coupled with vector router use in some embodiments) allows the vectored DSL system to scale to larger (or smaller) numbers of ports, and no hardwired/dedicated data bus is required between each modem and vector processor. Appropriate error signal packets and configuration and control messages also can flow over the network accordingly.

The VRC pairing configuration 518, 522 effectively converts data consideration from a per-port modem basis to a per-band (or per-frequency-set) VPC basis, at least for crosstalk cancellation pre-processing. Because crosstalk cancellation is most effectively and easily performed in the frequency domain on a per-tone, per-band or per-tone-set basis, this conversion greatly reduces the complexity of the vectoring system's implementation. Matching sub-bands (that is, groupings of the same one or more frequencies, referred to as "tone groupings," "tone sets," "sub-bands" and the like) from every modem 512 in the vectoring system 500 are collected and aggregated to enable crosstalk cancellation inside a VPC 524 between each victim modem and any set or subset of disturber modems.

As will be appreciated by those skilled in the art, the sub-bands assigned to each VPC 524 do not have to consist of contiguous frequencies in the system. For example, if there are 6 VPCs 524 in vectoring module 520, each consecutive VPC 524 may take the next frequency or frequency bin, meaning that the "first" VPC 524 will get frequencies 1, 7, 13, 19, etc. and the "fourth" VPC 524 will get frequencies 4, 10, 16, etc. Alternately, each VPC 524 can be sent a tone set, for example groups of 8 tones each, so that the first VPC 524 gets tones 0-7, the second VPC 524 gets tones 8-15, etc. Such distributions of data can provide a more "even" usage of available resources, for example preventing "clogging" of one or more given communication lines 526 due to a data dump from the relevant VRCs 522 to a single VPC 524 while the remaining VPCs 524 and lines 526 are idle.

The data on the private vectoring data network of system 500 consists of special purpose packets identifying the source modem 512 and destination VPC 524. Alternatively, the source and destination address can be implied by the packet timing. Each packet consists of IFFT input (and/or FFT output) data for one sub-band to/from one modem 512. Because DMT-based DSL systems operate using a DMT symbol period (for example, 4 kHz or 8 kHz), data communications from the modems 512 to the VPCs 524 and back again are repeated for every DMT symbol, possibly using pipelining of the communication and computation to use available networking bandwidth and computational resources more efficiently. Per-tone training/tracking error signals, diagnostic data to/from the modems 512 and other configuration and/or management data can use the same networking communication path and packet structure.

Various hardware devices and/or components can be used to implement embodiments of the present invention. Various current FPGAs and the like are suitable for constructing configurations according to embodiments illustrated herein. For example, Altera Stratix IV GX FPGA devices (e.g., EP4SGX70, EP4SGX110, EP4SGX230, etc.) are appropriate for such implementations. In some embodiments of the present invention, each VPC 524 is a separate chip (FPGA, ASIC, etc.) on which are programmed multiple VPUs as defined below. Other hardware configurations will be apparent to those skilled in the art.

As illustrated in FIG. 6A, each VPC 524 of FIG. 5 can contain or implement one or more dedicated vector processing units 542 (VPUs), each of which performs vectoring for a subset of the modems and/or disturbers. Allocation and/or sharing of the VPU resources may be advantageous in some cases and can be accomplished in various ways. For example, each VPC 524 can contain a centralized set of VPUs 542 that are time-shared among all of the modems 512 for vectoring within a given sub-band. Alternately, each VPC 524 can contain a distributed set of VPUs 542 in which each VPU 542 is dedicated to a particular modem 512 within the sub-band assigned to the VPC 524. Multiple VPUs 542 can coordinate communication between their host VPC 524 and one or more VRC-Vs 522 using a VPU dispatcher 544 or the like.

A VPU 542 processes all of the IFFT/FFT data for a tone set (for example, a single tone, a group of tones, a band or sub-band of tones, etc.) for all of the modems making up the vectored DSL system. The VPU 542 processes this data once per DMT symbol, in a somewhat periodic manner. As noted above, in some embodiments, each VPC 524 is a collection of one or more VPUs 542, where each VPU 542 independently processes its batches of tones without any explicit communication with other VPUs 542. In a simple exemplary setting, a system might use 4096 tones, 2 VPUs, and N modems. Each VPU 542 handles tones in batches of 16 tones. Tones can be assigned to VPUs as follows:

VPU0: tones 0-15, 32-47, . . .
VPU1: tones 16-31, 48-63, . . .

In this example, the modems provide their FFT/IFFT data to the VRC-based private network in tone order from 0 to 4095. When the FFT/IFFT data gets routed to the VPCs, the VRC distributes data like "dealing cards" to the two VPUs in batches of 16 tones. This keeps the data networking pathway and VPUs uniformly busy without bottlenecks. For each tone, the VPU performs the equivalent of an N×N matrix multiply to perform vectoring (or maybe less than a full N×N multiply if the vectoring matrix is "sparse").

Each VPU has a pre-determined processing capability level (for example, number of complex multiplications per second), based on the logic design and chip technology utilized. Additionally, the required level of processing power "per tone" for the vectoring system will increase as the number of modems, N, increases. Thus, the required number of VPUs is a function of the number of modems in the system and the number of vectored tones over the DMT bandwidth. Therefore, systems with a large number of vectored tones and/or a large number of modems will consequently need a larger number of VPU resources (and consequently VPC chips) to perform vectoring. That is, as the number of modems increases in a vectored system, the number of tones that each VPU can process will decrease due to the additional modems' data that need to be processed. As will be appreciated by those skilled in the art, the size of each sub-band can be determined by cost and complexity limits for a given implementation, as well as the DSL band profiles that are supported by the design. For example, in an implementation for a system having a 17 MHz VDSL profile, 384 modems, and vectoring up to 64 disturbers per modem, a practical system would have on the order of 128 VPUs with each VPU processing 32 tones per DMT symbol. As the VPU logic is reconfigured to reflect any changing dimensions of the system (number of modems, number of vectored tones, etc.), vector routing is adjusted accordingly.

In yet another embodiment of the present invention illustrated in FIG. 6B, a simplified system 500' fits onto a single line-card 510. Once again, VRC resources 518 (a single VRC, for example, or alternately two VRCs back-to-back) provide routing between modem ports and the VPCs 524 that provide processing of designated sub-bands.

Figure 7:
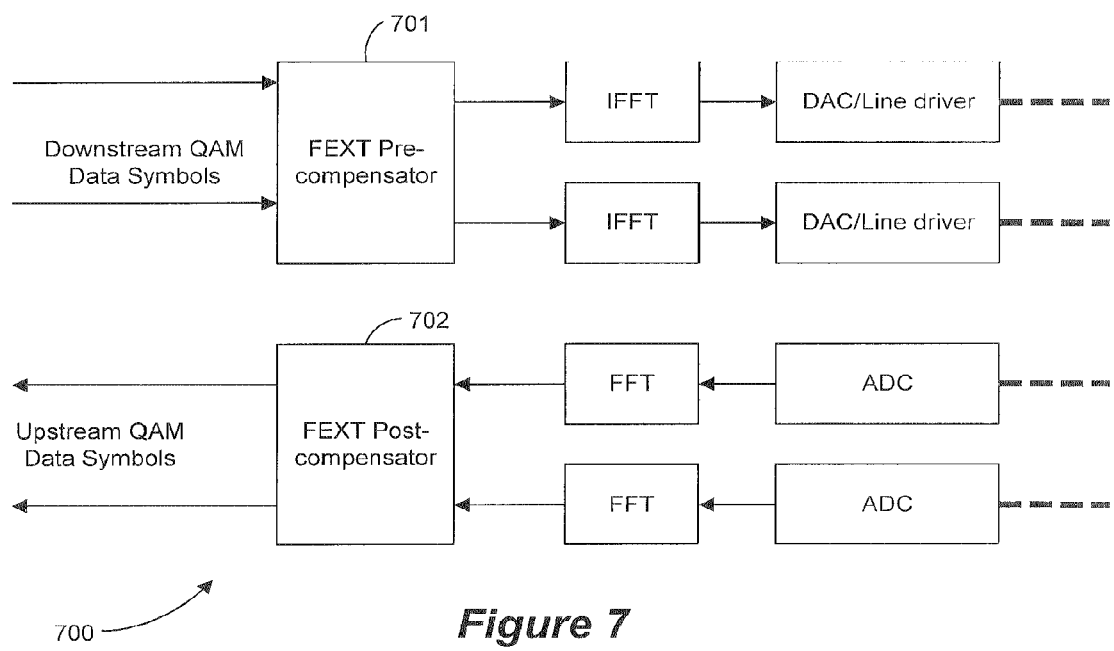
FIG. 7 is a block diagram of a DSL data processing stream in which embodiments of the present invention can be implemented.

FIG. 7 illustrates general operation of the vectoring operation 700, wherein efficient implementation of the downstream FEXT pre-compensator 701 and upstream FEXT post-compensator 702 can be accomplished using one or more embodiments of the present invention. In the downstream direction, a plurality of QAM data symbols from a plurality of modems is FEXT pre-compensated by coordinating or "vectoring" communication among all modems on a per-tone basis, followed by subsequent IFFT and digital-to-analog conversion operations on a per-modem basis to transmit the FEXT-compensated signal onto the Telco copper pair. In the upstream direction, a plurality of received FFT samples, including pseudo signal-based alien interference data, is FEXT post-compensated by coordinating or "vectoring" communication among all modems on a per-tone basis, followed by subsequent decoding of the QAM data symbols on a per-modem basis.

Figure 8A:
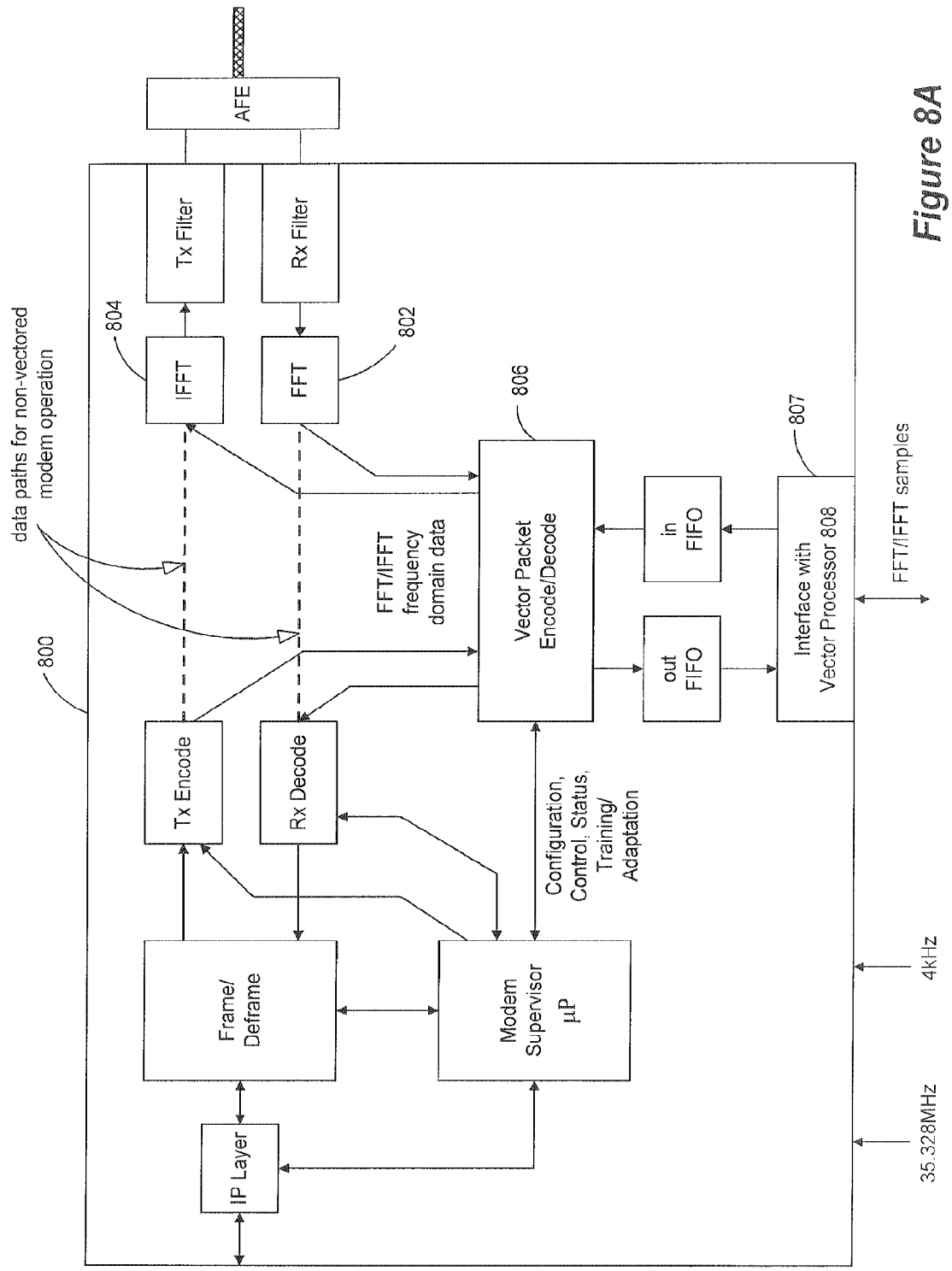
FIG. 8A is a block diagram of a DSLAM modem in which vectoring can be implemented.
Figure 8B:
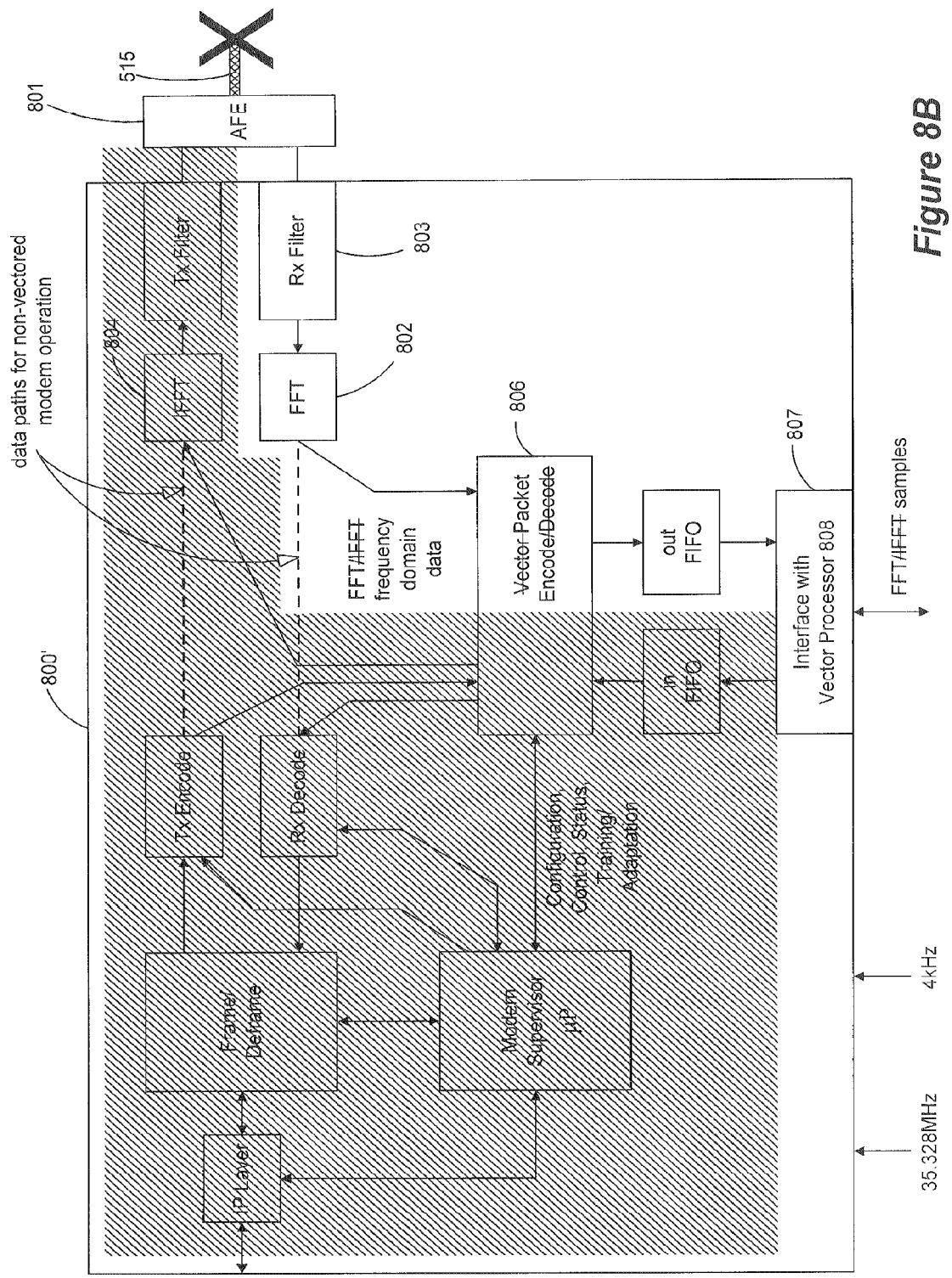
FIG. 8B is a block diagram of a DSLAM modem augmented to use minimum components needed to process pseudo signals collected from an inactive line and/or common-mode voltage signal source line in some embodiments of the present invention.

FIG. 8A shows a modem port for a DSLAM side VDSL modem device 800 that has been modified to support vectored DSL implementation in connection with one or more embodiments of the present invention. The upstream FFT 802 outputs and the downstream IFFT 804 inputs are intercepted by a vector packet encoder/decoder 806 (or "vectoring data extractor") and sent to a vector processor 808 via interface 807 to allow vectoring of the data stream among all modems in the vectoring group. By removing, processing and "reinserting" data from the data stream, such a vector processor system may introduce a small number of symbols of latency in the modem's receive and transmit data paths. FIG. 8B shows how the device 800 of FIG. 8A can be modified to use several components in connection with the receipt and processing of pseudo signals from an inactive line 515. In this embodiment pseudo signals are collected using the analog front-end 801, provided to the receive filter 803, and processed using upstream FFT 802. The transformed pseudo signals are encoded at 806 and sent to a vector processor 808 via an appropriate interface 807. Appropriate clock signals are provided to device 800' for formatting the collected pseudo signals.

Figure 9A:
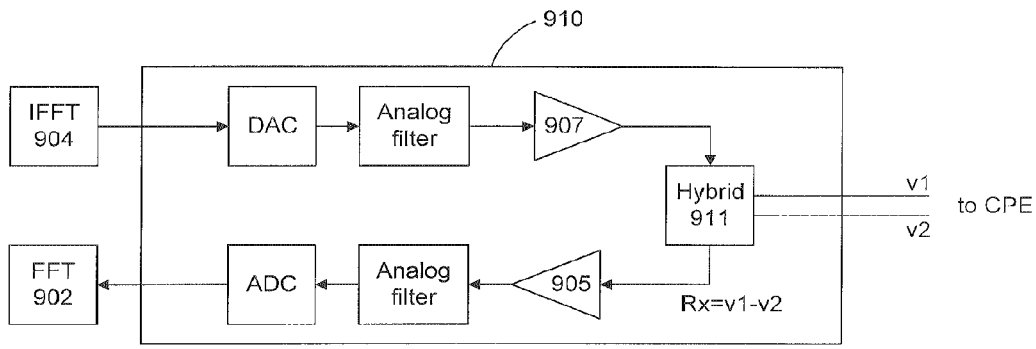
FIGS. 9A, 9B and 9C show different front-end analog configurations usable in connection with embodiments of the present invention.
Figure 9B:
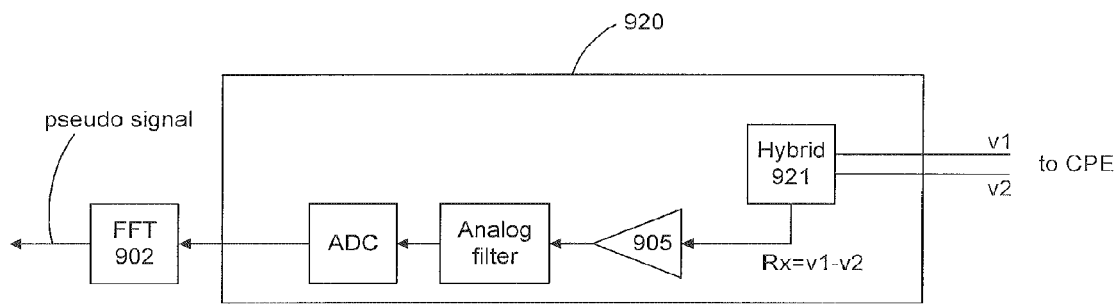
Figure 9C:
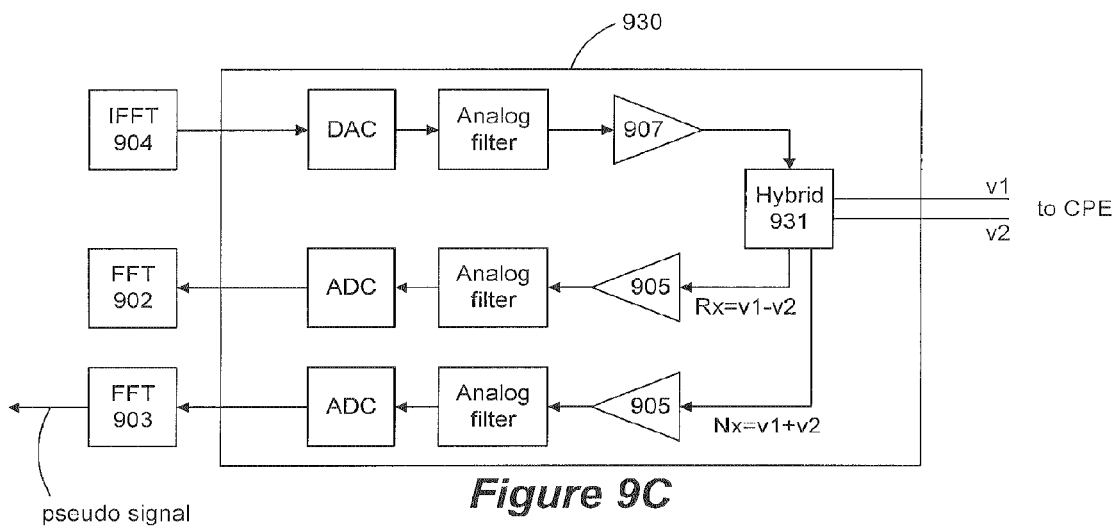

FIG. 9A illustrates typical differential voltage signaling and its treatment in the "analog front-end" (AFE) of modems like those shown in FIGS. 8A and 8B. Two reference voltages to ground, v1 and v2, are transmitted by the CPE device to modem AFE 910 in a DSL system and are received by a hybrid 911 that uses the difference between these voltages (designated "Rx" in FIG. 9A) fed to a receive amplifier 905 to determine the transmitted (the same principle applies to all differential voltage signaling on telephone twisted pairs). In embodiments of the present invention using inactive lines, as shown in FIG. 9B, the inactive line modem AFE 920 receives the two reference voltages v1 and v2, and again uses the difference Rx fed by hybrid 921 to a receive amplifier 905 to obtain the pseudo signal as the output of the FFT unit 902 in FIG. 9B. In another embodiment of the present invention shown in FIG. 9C, the twisted pair may be used for DSL transmissions, telephone communications, etc., so differential voltage signaling is being used on the line (here, a CPE device is shown connected to the modem AFE 930, but this is not necessary). While the AFE hybrid 931 produces a differential voltage value Rx for use in modem AFE 930, a second common-mode voltage signal Nx is obtained by adding v1 and v2 together. Because v1 and v2 are nominally supposed to be equal in magnitude and opposite in polarity when generated at a CPE, etc., adding these two voltages should result in no signal. However, interference introduced during transmission will show up as a residual voltage in Nx and can be fed to receive amplifier 905 to generate a pseudo signal as the output of FFT unit 903.

Figure 10:
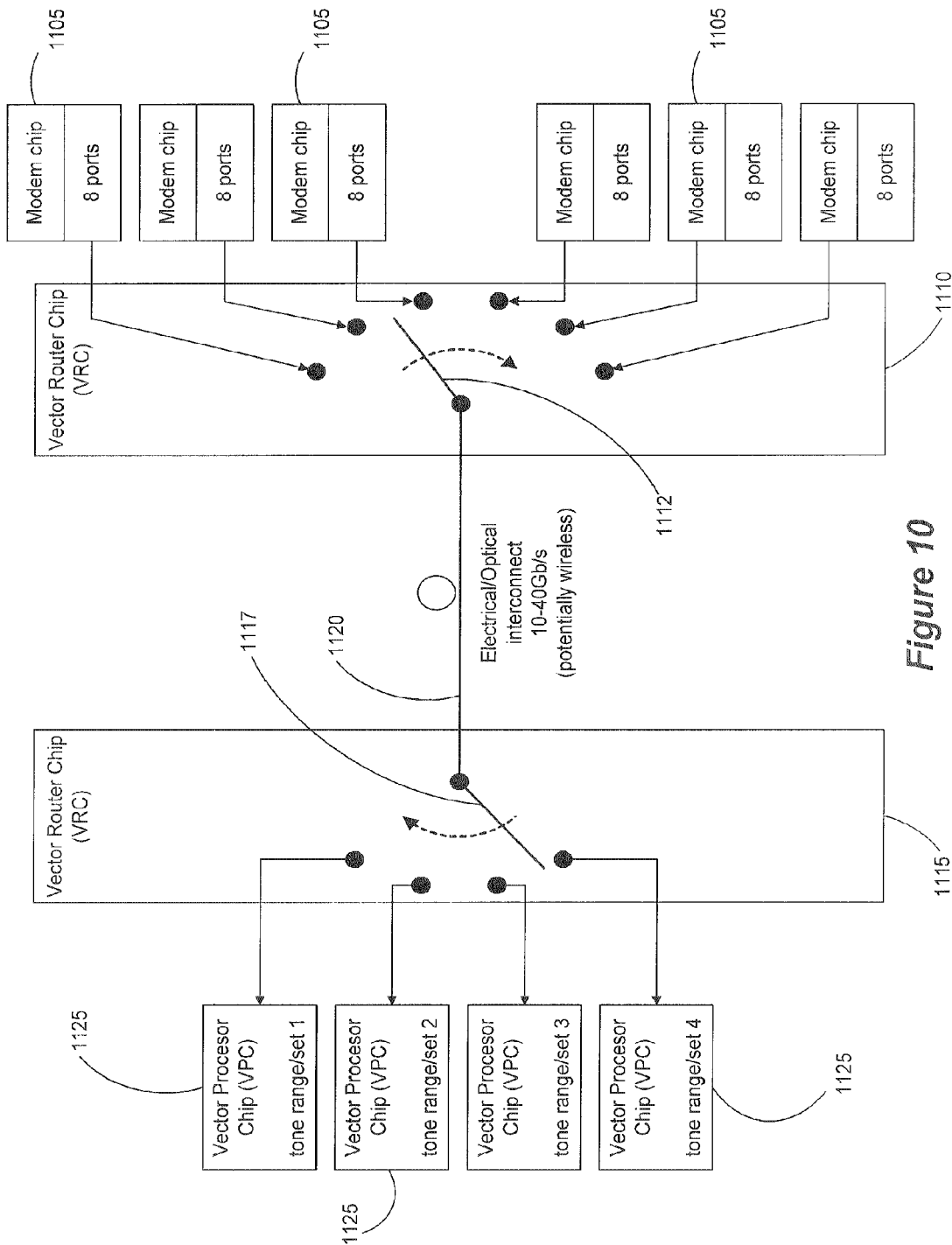
FIG. 10 is a block diagram showing an exemplary data transmission configuration for use in connection with one or more embodiments of the present invention.
Figure 11:
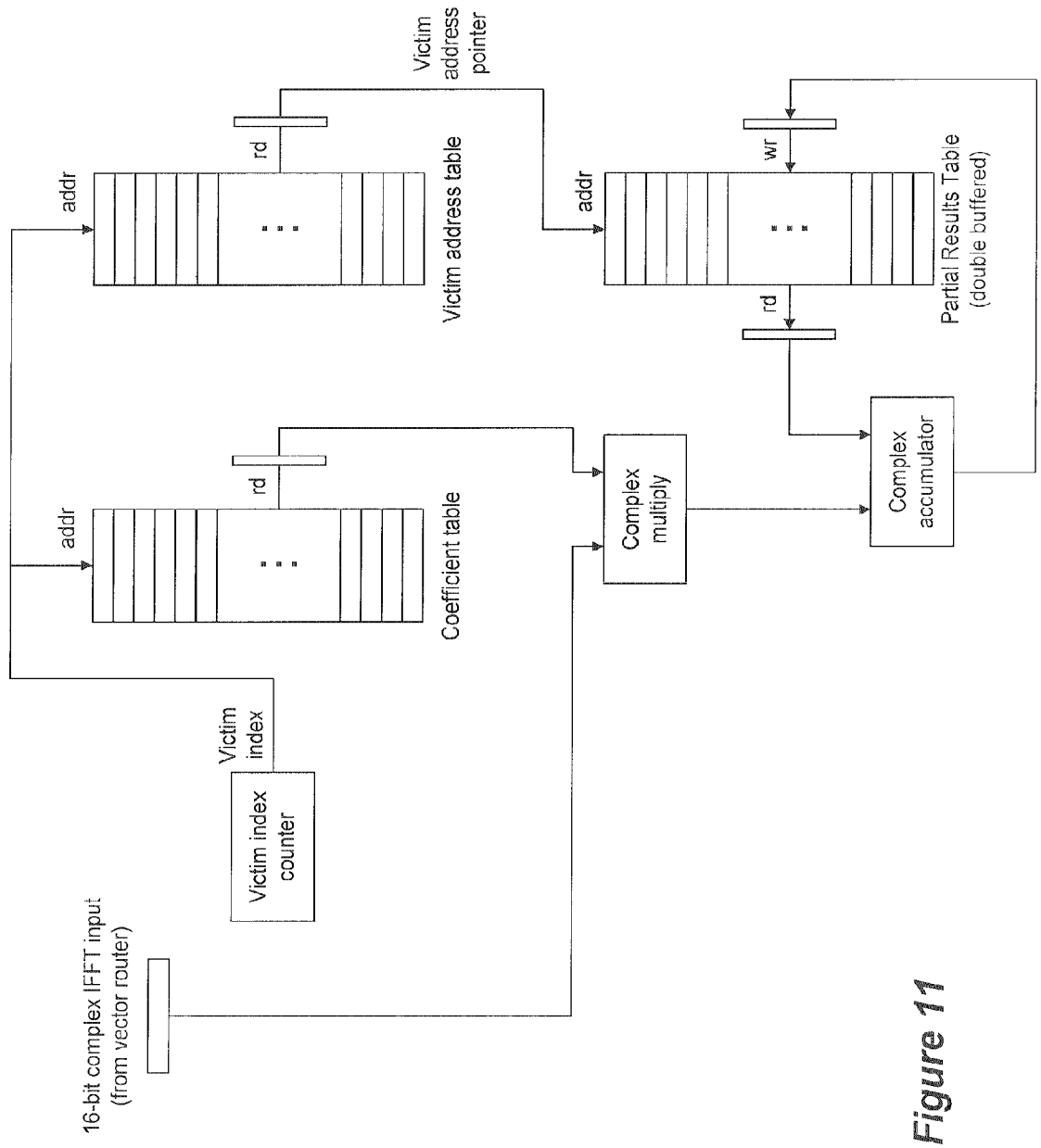
FIG. 11 is an exemplary logic implementation of a vector processor unit according to one or more embodiments of the present invention.

FIG. 10 illustrates an embodiment of the present invention in which the vector router chips 1110, 1115 communicate data from six modems 1105 (the number of modems can vary as appropriate and can include one or more inactive lines, as desired) to four VPCs 1125 (again, the number of VPCs can vary as appropriate) using a sweep-select 1112 to collect data from the modems 1105 and a sweep-distribution 1117 to distribute the collected data to the vector processor chips 1125. As can be seen in FIG. 11, the VRC-L 1110 is coupled to the VRC-V 1115 by a suitable interconnect 1120. The bus bandwidth used/needed/required can be determined in instance as follows:

Bandwidth=nPorts*(Data Precision)*2*4 kHz in which "2" indicates complex arithmetic. Finally, bandwidth bottlenecks can be avoided using the "striping" shown in FIG. 10.

FIG. 11 illustrates one exemplary logic implementation of a vector processor unit. In this example, the sub-unit can process a single tone and FIG. 11 traces the data path for a vector processor core according to one or more embodiments of the present invention. This exemplary VPU is capable of processing one DMT tone at a time. As IFFT/FFT samples from each modem arrive from the vector router, the VPU determines the list of "victim" modems that must be FEXT canceled for this disturber. Using pre-determined FEXT cancellation coefficients from the coefficient table and the victim address list, the impact of this disturber can be accumulated into the partial results table for each victim modem (partial result of the FEXT cancellation operation). After the full set of disturber data has been received from the vector router for this tone and FEXT cancellation has been completed, the partial results table will then contain the resultant vectored IFFT/FFT samples for the current DMT tone, and this vectored data in then sent back to the vector router for transmission back to the modem ports.

Figure 12:
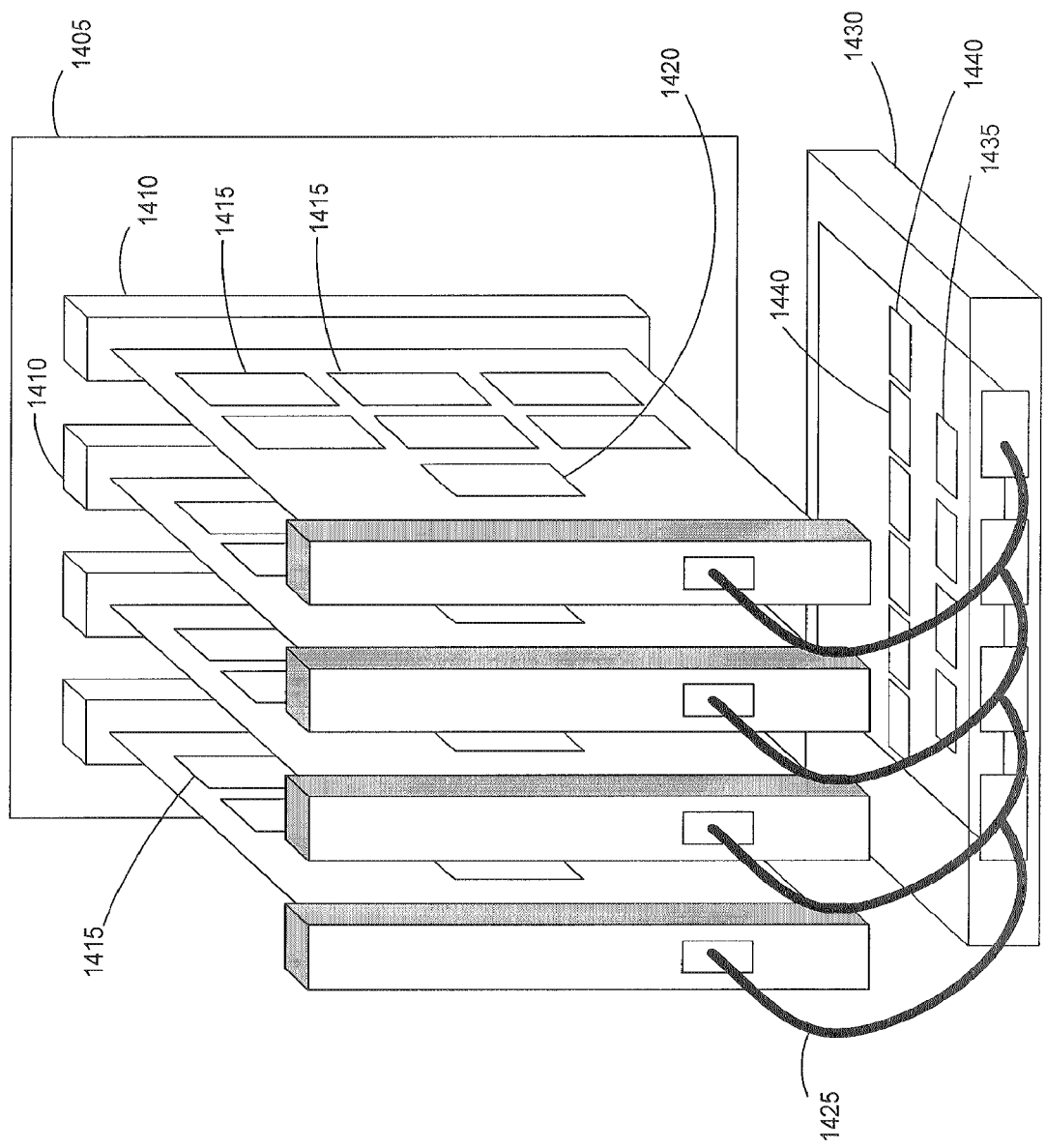
FIG. 12 is an exemplary DSLAM architecture showing a dedicated vectoring module with four line cards providing user data and/or pseudo signals for vectoring.

The vectoring data communication system of FIG. 12 illustrates a DSLAM architecture embodiment showing a dedicated vectoring module 1430 with four line cards providing upstream DSL user data for vectoring, including pseudo signals from one or more inactive lines. Line cards 1410 are mounted to a chassis or the like 1405 and each line card includes several modem chips 1415 and a vectoring interface device 1420. Each interface device 1420 communicates via optical interconnect 1425 with the vectoring module 1430, which can be a pizza box or a line card. Each module 1430 contains a line card interface chip 1435 that corresponds to one of the interface devices 1420 on line cards 1410. A number of processing chips 1440 are available for vector processing of user data.

Figure 13:
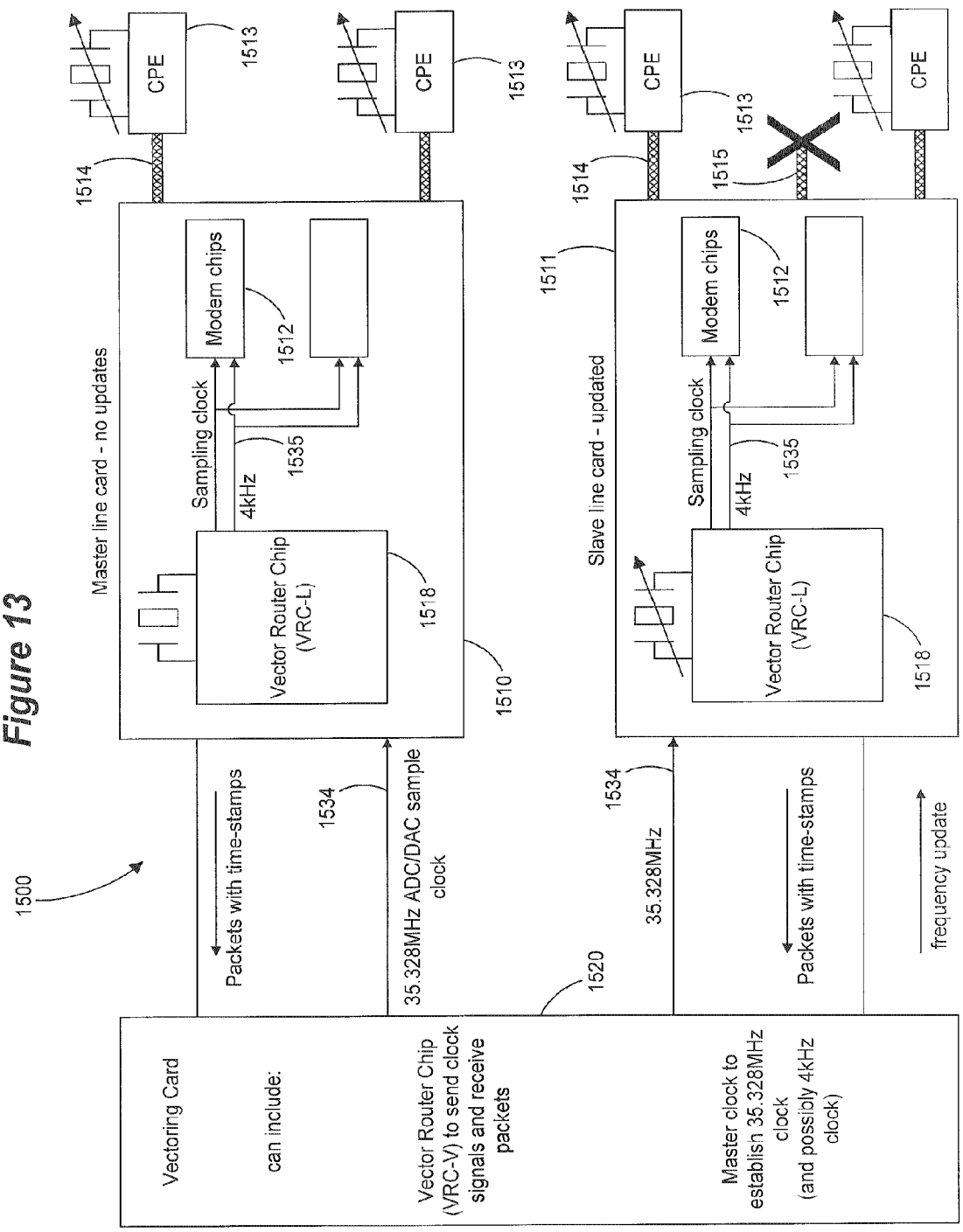
FIG. 13 illustrates clock synchronization of components in a vectored DSL system according to one or more embodiments of the present invention.

As illustrated in the system 1500 of FIG. 13 having a master line card 1510 and a slave line card 1511, in order for vectoring to work properly, all modems 1512 in the vector group must be synchronized to both an ADC/DAC sample clock 1534 and a DMT symbol clock 1535, shown as 35.328 MHz and 4 kHz, respectively. The DSLAM side modems 1512 are connected via active DSL lines 1514 to a number of customer-side DSL modems 1513. One or more inactive lines 1515 also are present. The high-speed sample clock is assumed to be distributed in some manner over a backplane or dedicated cable. The VRC-Ls 1518 can then phase lock to the high-speed sample clock and redistribute a low-noise sample clock to the modem chips 1517. In order to avoid sending a dedicated 4 kHz DMT symbol clock over the backplane or dedicated cable, it would be advantageous to use the high-speed communication interface intended to transmit vectoring data (XAUI or similar) to send timing information in data packets. The high-speed interface operates at a sufficiently high speed, that the approximate DMT symbol timing can be determined from such timing packets. As there is some tolerance to the exact DMT symbol timing (made possible, for example, by cyclic prefix and cyclic extension in the VDSL protocol), the VRC-L 1518 needs to determine only the approximate symbol timing provided that it will remain consistent thereafter (that is, synchronized to some fixed number of the high-speed sample clock periods).

Many features and advantages of the invention are apparent from the written description, and thus, the appended claims are intended to cover all such features and advantages. Further, numerous modifications and changes will readily occur to those skilled in the art, so the present invention is not limited to the exact operation and construction illustrated and described. Therefore, described embodiments are illustrative and not restrictive, and the invention should not be limited to the details given herein but should be defined by the following claims and their full scope of equivalents, whether foreseeable or unforeseeable now or in the future.

The invention claimed is:

1. A method of removing correlated alien interference from upstream DSL user signals in a vectored DSL system, the method comprising:
   generating alien interference data by removing in-domain interference created by a plurality of active lines in the vectored DSL system from collected pseudo signals comprising the in-domain interference and correlated alien interference affecting the plurality of active lines; and
   converting the alien interference data into FEXT cancellation coefficients used in the vectored DSL system.

2. The method of claim 1 wherein the pseudo signals are collected from one or more of the following:
   one or more inactive lines, wherein each inactive line comprises a twisted copper pair that does not carry upstream transmissions using an upstream frequency set used by the plurality of active lines for upstream transmissions on the plurality of active lines;
   one or more common-mode voltage signal source lines, wherein each common-mode voltage signal source line comprises a twisted copper pair coupled to an upstream-end modem, wherein the upstream-end modem comprises:
     an analog front-end comprising a hybrid configured to generate a common-mode voltage signal from transmissions on the common-mode voltage signal source line received by the upstream-end modem; and
     a fast Fourier transform unit for generating pseudo signals derived from the generated common-mode voltage signals.

3. The method of claim 2 further comprising performing DSL vectoring of the plurality of active lines by applying the FEXT cancellation coefficients converted from the alien interference data to upstream DSL user signals on the plurality of active lines.

4. The method of claim 3 wherein at least one inactive line comprises a twisted copper pair coupled to a DSL modem device located in one of the following: a central office, a DSLAM, an upstream-end line card, an optical networking unit, a pedestal.

5. The method of claim 4 wherein the DSL modem device comprises an amplifier coupled to the twisted copper pair, a filter coupled to the amplifier, an analog-to-digital converter coupled to the filter, a fast Fourier transform (FFT) unit coupled to the filter, a packet encoder coupled to the FFT unit, a vector processor coupled to the packet encoder.

6. The method of claim 2 wherein the one or more inactive lines comprise a first inactive line having first pseudo signals comprising first correlated alien interference and a second inactive line having second pseudo signals comprising second correlated alien interference, wherein the first alien interference is different from the second alien interference.

7. A method for performing DSL vectoring in a DSL system having a plurality of active lines, the method comprising:
   transmitting test signal input signals on the plurality of active lines;
   collecting test signal output signals from the active lines;
   collecting pseudo signals comprising in-domain interference and correlated alien interference;
   removing in-domain interference from the collected pseudo signals to generate alien interference data; and
   performing DSL vectoring of the plurality of active lines using the alien interference data.

8. The method of claim 7 wherein removing in-domain interference from the collected pseudo signals comprises using the collected test signal output signals to remove in-domain active line FEXT interference from the pseudo signals to generate the alien interference data.

9. The method of claim 8 wherein performing DSL vectoring of the plurality of active lines comprises using the alien interference data to generate FEXT cancellation coefficients and using the generated FEXT cancellation coefficients to reduce or remove correlated alien interference affecting upstream DSL transmissions on the plurality of active lines.

10. The method of claim 9 wherein performing DSL vectoring of the plurality of active lines comprises generating de-correlated signals corresponding to upstream DSL user signals.

11. The method of claim 10 wherein performing DSL vectoring of the plurality of active lines comprises performing vectoring in a vectoring unit coupled to a plurality of line cards on which modems of the plurality of active lines and one or more upstream-end modems from which the pseudo signals are collected.

12. The method of claim 11 wherein the vectoring unit performs vectoring of active line DSL transmissions using collected upstream DSL user data and the alien interference data comprises generating an alien interference effects row or column in a FEXT coefficient matrix used in vectoring.

13. The method of claim 12 wherein the correlated alien interference comprises interference from one or more of the following: radio frequency interference (RFI), motor noise, electrical noise, crosstalk interference from alien DSL lines.

14. The method of claim 13 wherein transmitting test signals on the plurality of active lines comprises sending at least one of the following: training data signals, tracking data signals.

15. A method for performing DSL vectoring in a DSL system having a plurality of active lines, the method comprising:
   transmitting test signal input signals on the plurality of active lines;
   collecting test signal output signals from the active lines;
   collecting pseudo signals comprising in-domain interference and correlated alien interference;
   removing in-domain interference from the collected pseudo signals to generate alien interference data; and
   performing DSL vectoring of the plurality of active lines using the alien interference data,
   wherein removing in-domain interference from the collected pseudo signals comprises using the collected test signal output signals to remove in-domain active line FEXT interference from the pseudo signals to generate the alien interference data.

* * * * *

UNITED STATES PATENT AND TRADEMARK OFFICE
CERTIFICATE OF CORRECTION

PATENT NO. : 8,897,347 B2  Page 1 of 1
APPLICATION NO. : 14/144116
DATED : November 25, 2014
INVENTOR(S) : Sands et al.

It is certified that error appears in the above-identified patent and that said Letters Patent is hereby corrected as shown below:

In the Specification

In Column 4, Line 22, delete "$H_{11},H_{12},....,H_{1U},H_{U2},......,$" and insert -- $H_{11},H_{12},....,H_{1U},H_{21},......,$ --, therefor.

In Column 4, Line 23, delete "Output" and insert -- $Output_u$ --, therefor.

In Column 15, Line 28, delete "Bandwidth=nPorts*(Data Precision)*2*4 kHz" and insert -- Bandwidth=nPorts*(Data_Precision)*2*4 kHz --, therefor.

Signed and Sealed this
Fourteenth Day of April, 2015

Michelle K. Lee
*Director of the United States Patent and Trademark Office*